(12) United States Patent
Ebara et al.

(10) Patent No.: US 12,608,285 B2
(45) Date of Patent: Apr. 21, 2026

(54) STORAGE SYSTEM AND PATH MANAGEMENT METHOD

(71) Applicant: Hitachi Vantara, Ltd., Yokohama (JP)

(72) Inventors: Hiroto Ebara, Tokyo (JP); Takahiro Yamamoto, Tokyo (JP); Misato Yoshida, Tokyo (JP); Yoshinori Ohira, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 0 days.

(21) Appl. No.: 18/830,166

(22) Filed: Sep. 10, 2024

(65) Prior Publication Data

US 2025/0278338 A1      Sep. 4, 2025

(30) Foreign Application Priority Data

Mar. 1, 2024      (JP) ................................. 2024-031047

(51) Int. Cl.
*G06F 11/1446*           (2026.01)

(52) U.S. Cl.
CPC ...... *G06F 11/1464* (2013.01); *G06F 2201/84* (2013.01)

(58) Field of Classification Search
CPC .............................. G06F 11/1464; H04L 67/26
See application file for complete search history.

(56) References Cited

U.S. PATENT DOCUMENTS

| | | | |
|---|---|---|---|
| 2003/0014523 A1* | 1/2003 | Teloh ................... | G06F 11/2074 |
| | | | 714/E11.107 |
| 2004/0243699 A1* | 12/2004 | Koclanes ............ | H04L 41/5019 |
| | | | 709/224 |
| 2006/0143510 A1* | 6/2006 | Ikeda ................... | G06F 11/2064 |
| | | | 714/11 |
| 2008/0104347 A1* | 5/2008 | Iwamura ............... | G06F 3/0619 |
| | | | 711/E12.103 |
| 2011/0038253 A1* | 2/2011 | Yabusaki ................ | H04L 45/28 |
| | | | 370/217 |
| 2011/0099360 A1* | 4/2011 | Bashir ................. | G06F 11/1417 |
| | | | 711/E12.008 |
| 2012/0140679 A1* | 6/2012 | Inaba .................... | H04L 12/437 |
| | | | 370/258 |
| 2013/0124464 A1* | 5/2013 | Rank ..................... | G06F 16/275 |
| | | | 707/610 |
| 2014/0280711 A1* | 9/2014 | Asati ........................ | H04L 45/28 |
| | | | 709/217 |
| 2014/0351538 A1* | 11/2014 | Kono ..................... | G06F 3/065 |
| | | | 711/162 |
| 2015/0363286 A1* | 12/2015 | Blea .................... | G06F 11/2058 |
| | | | 714/6.3 |
| 2018/0032254 A1 | 2/2018 | Okada et al. | |
| 2021/0218636 A1* | 7/2021 | Parvathamvenkatas ..................... | |
| | | | H04L 41/0883 |

* cited by examiner

*Primary Examiner* — Tarek Chbouki
(74) *Attorney, Agent, or Firm* — Volpe Koenig

(57)           ABSTRACT

A first management device is provided that sets, when a second storage node is increased/decreased at a secondary site, a new remote copy path between a first storage node provided with a primary volume associated with a secondary volume moved in accordance with the increase/decrease, and deletes an original remote copy path set between the second storage that is a movement source of the secondary volume moved in accordance with the increase/decrease and the first storage node.

12 Claims, 16 Drawing Sheets

| NODE ID | STATE | STORAGE DEVICE ID LIST | PORT ID LIST |
|---------|-------|------------------------|--------------|
| 0 | Normal | 0,1,2 | 0,1 |
| 1 | Normal | 3,4 | 2,3 |
| 2 | Normal | 5,6 | 4,5 |
| ... | ... | ... | ... |

| STORAGE DEVICE ID | STATE | SIZE |
|-------------------|-------|------|
| 0 | Normal | 1400GB |
| 1 | Normal | 1400GB |
| 2 | Failure | 2000GB |
| ... | ... | ... |

| PORT ID | STATE | ADDRESS |
|---------|-------|---------|
| 0 | Normal | 172.12.16.200 |
| 1 | Normal | 172.12.16.201 |
| 2 | Normal | 172.12.16.202 |
| ... | ... | ... |

| VOLUME ID | OWNER ID | BACKWARD DESTINATION ID | SIZE | ATTRIBUTE | NODE ID |
|-----------|----------|-------------------------|------|-----------|---------|
| 0 | 0 | 0 | 500GB | NORMAL VOL | 0 |
| 1 | 1 | 2 | 1200GB | PVOL | 1 |
| 2 | 1 | 2 | 2400GB | JNLVOL | 1 |
| ... | ... | ... | ... | ... | ... |

| VOLUME PAIR ID | PRIMARY VOL ID | PRIMARY JNLVOL ID | SECONDARY JNLVOL ID | SECONDARY VOL ID | PATH ID | STATE | ATTRIBUTE |
|---|---|---|---|---|---|---|---|
| 0 | 1 | 2 | 102 | 101 | 0 | Normal | Active |
| 1 | 1 | 2 | 109 | 102 | 1 | Normal | Standby |
| 2 | 5 | 3 | 100 | 108 | 9 | Copying | Active |
| ... | ... | ... | ... | ... | ... | ... | ... |
| 44A | 44B | 44C | 44D | 44E | 44F | 44G | 44H |

| PATH ID | PROTOCOL INFORMATION | IP ADDRESS | | ACCESS POLICY | PRIORITY PATH |
|---------|---------------------|------------|---------|---------------|---------------|
| | | PATH 1 | PATH 2 | | |
| 0 | iSCSI | P:172.12.16.202 S:172.12.16.203 | P:172.12.16.302 S:172.12.16.303 | ASYMMETRY | P:172.12.16.202 S:172.12.16.203 |
| 1 | iSCSI | P:172.12.16.200 S:172.12.16.201 | P:172.12.16.300 S:172.12.16.301 | SYMMETRY | – |
| ⋮ | ⋮ | ⋮ | | ⋮ | ⋮ |
| 45A | 45B | 45CA | 45CB | 45D | 45E |
| | | 45C | | | |

STORAGE SYSTEM AND PATH MANAGEMENT METHOD

BACKGROUND OF THE INVENTION

1. Field of the Invention

The present invention relates to a storage system and a path management method, and is preferably applied to, for example, a storage system configured to perform data protection by remote copy among a plurality of sites.

2. Description of the Related Art

Conventionally, a storage system including a plurality of storage nodes is known. For example, predetermined software is executed in each storage node to provide a storage system.

In addition, there is a remote copy function as a technique for replicating a storage system a among plurality of geographically separated data centers in order to continue business even when a disaster occurs. In a storage system including a plurality of nodes and equipped with a remote copy function, a site that processes a business application at a normal time is referred to as a primary site, and a site that is switched from the primary site and operated when a failure of the entire site occurs on the primary site side and the storage system is stopped is referred to as a secondary site.

For example, US 2018/0032254 A discloses a technique in which, in a configuration in which a secondary site is configured by a plurality of storage devices, when a remote copy pair is formed between a primary site and a secondary site, a storage device on the secondary site side is selected so as to satisfy performance and capacity requirements of the primary site to establish the pair.

SUMMARY OF THE INVENTION

Meanwhile, in a storage system using a software defined storage (SDS), scale-out is performed by increasing a storage node on which the SDS is mounted in a case where performance or capacity is insufficient. At this time, in order to improve performance and reliability, software (hereinafter referred to as storage control software) that functions as a storage controller of the SDS arranged in another storage node, the storage control software, and a logical volume owned by the storage control software are rearranged in an increased storage node (hereinafter referred to as an increased storage node). Note that the "ownership" of the logical volume is a right to manage the logical volume and perform I/O process on the logical volume. Only the storage control node having the ownership of the logical volume can perform I/O process on the logical volume.

Therefore, when the secondary volume of the logical volume of the copy source (hereinafter referred to as a primary volume), and the logical volume of the copy destination (hereinafter referred to as a secondary volume) having the remote copy configuration is moved to the increased storage node due to scale-out at the secondary site, it is necessary to reset the path for remote copy (hereinafter referred to as a remote copy path) between the storage node on the primary site side where the primary volume is created and the increased storage node which is the movement destination of the secondary volume, but US 2018/0032254 A does not disclose the resetting of the remote copy path in such a situation. However, in such a situation, in a case where resetting of the remote copy path is not performed, there is a problem that performance of the remote copy process deteriorates although a specific reason will be described later.

Furthermore, when scaling in with a storage system using SDS, it is necessary to rearrange the storage control software arranged in the storage node to be decreased and the logical volume owned by the storage control software in another storage node.

For this reason, in a case where the secondary volume of the primary volume and the secondary volume having the remote copy configuration is arranged in the decreased storage node, it is necessary to reset the remote copy path between the storage node of the movement destination of the secondary volume and the storage node on the primary site side where the primary volume corresponding to the secondary volume is created, but resetting of the remote copy path in such a situation is not disclosed in US 2018/0032254 A. However, in such a situation as well, in a case where resetting of the remote copy path is not performed, there is a problem that performance of the remote copy process deteriorates.

The present invention has been made in view of the above points, and aims to propose a storage system and a path management method capable of preventing performance deterioration of the remote copy process after increase/decrease of storage nodes.

In the present invention for solving the above problem, there is provided a storage system including one or a plurality of first storage nodes installed at a primary site and a plurality of second storage nodes installed at a secondary site, where the first storage node is provided with a primary volume provided to a host device as a storage area for reading and writing data, the second storage node is provided with a secondary volume as a storage area for backing up the data written in the corresponding primary volume, a remote copy path for remotely copying the data written in the primary volume to the secondary volume is set between the first storage node and the second storage node provided with the secondary volume corresponding to the primary volume provided in the first storage node, and a first management device that sets, when the second storage node is increased/decreased at the secondary site, a new remote copy path between the first storage node provided with the primary volume associated with the secondary volume moved in accordance with the increase/decrease, and deletes an original remote copy path set between the second storage that is a movement source of the secondary volume moved in accordance with the increase/decrease and the first storage node.

Furthermore, in the present invention, there is provided a path management method executed in a storage system including one or a plurality of first storage nodes installed at a primary site and a plurality of second storage nodes installed at a secondary site, in which the first storage node is provided with a primary volume provided to a host device as a storage area for reading and writing data, the second storage node is provided with a secondary volume as a storage area for backing up the data written in the corresponding primary volume, a remote copy path for remotely copying the data written in the primary volume to the secondary volume is set between the first storage node and the second storage node provided with the secondary volume corresponding to the primary volume provided in the first storage node, the storage system includes a first management device, a second management device that is disposed at the primary site and manages each of the first storage nodes installed at the primary site, and a third management device that is disposed at the secondary site and manages each of the second storage nodes installed at the secondary site, the method including a first step in which the first device management collects necessary information from the second and/or third management device when the second storage node is increased/decreased at the secondary site; and a second step in which the first management device instructs the second and third management devices to set a new remote copy path between the first storage node provided with the primary volume associated with the secondary volume moved in accordance with the increase/decrease based on the collected information, and delete the original remote copy path set between the second storage of a movement source of the secondary volume moved in accordance with the increase/decrease and the first storage node.

According to the storage system and the path management method of the present invention, even after the increase/decrease of the second storage node, it is possible to perform remote copy between the second storage node of a movement destination of the secondary volume moved with the increase/decrease and the first storage node in which the primary volume associated with the secondary volume exists via the newly created remote copy path.

According to the present invention, a storage system and a path management method capable of preventing performance deterioration of a remote copy process after increase/decrease of storage nodes can be realized.

BRIEF DESCRIPTION OF THE DRAWINGS

FIG. 8 is a table illustrating a configuration example of a system configuration management table;

FIG. 9 is a table illustrating a configuration example of a storage device management table;

FIG. 10 is a table illustrating a configuration example of a port management table;

FIG. 11 is a table illustrating a configuration example of a volume management table;

FIG. 12 is a table illustrating a configuration example of a volume pair management table;

FIG. 13 is a table illustrating a configuration example of a path management table;

DESCRIPTION OF THE INVENTION

Figure 1:
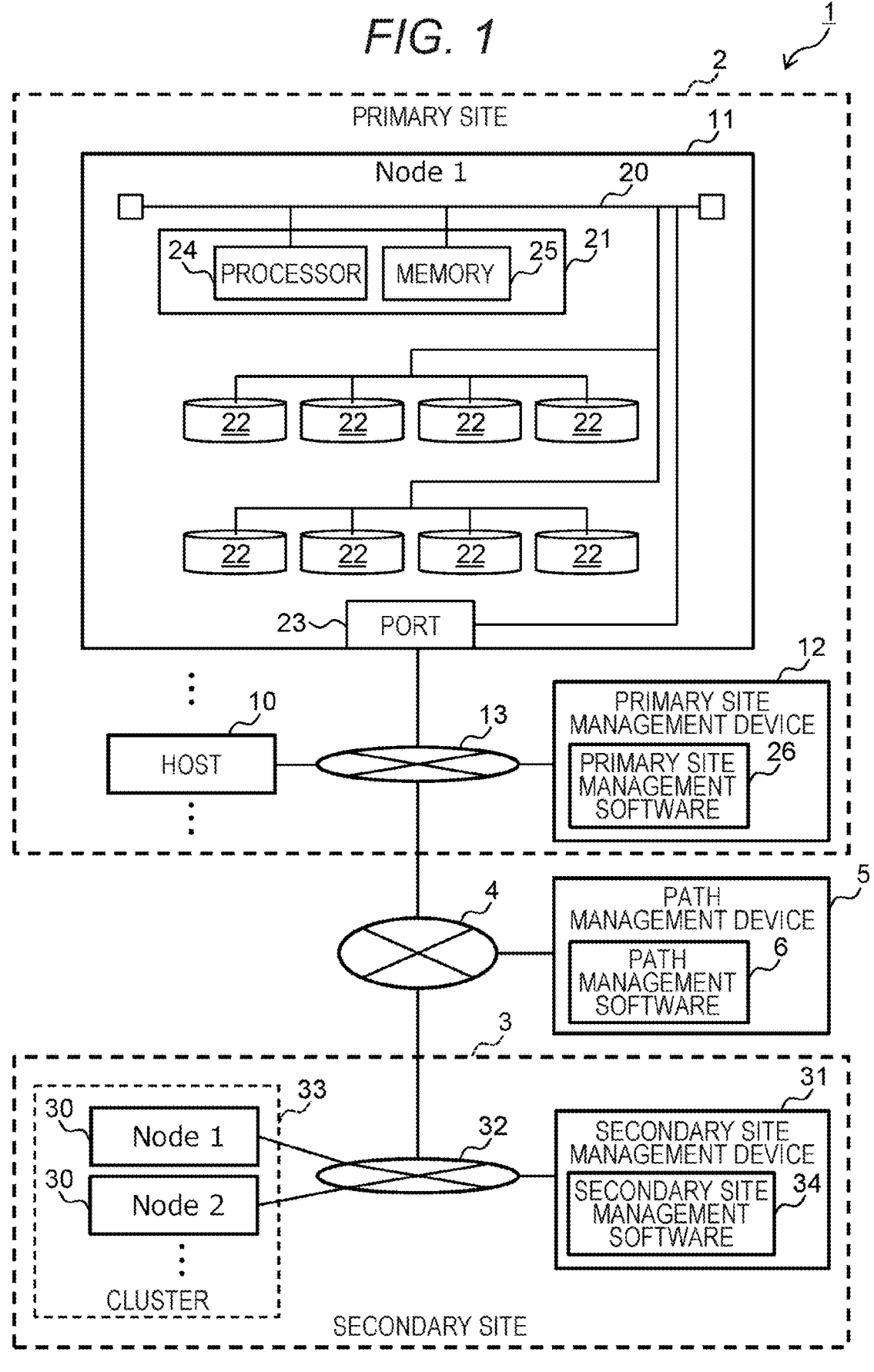
FIG. 1 is a block diagram illustrating a schematic overall configuration of a storage system according to an embodiment.

Hereinafter, one embodiment of the present invention will be described in detail with reference to the drawings.

In the following description, an "interface device" may be one or more communications interface devices. The one or more communications interface devices may be one or more homogeneous communications interface devices (for example, one or more network interface cards (NIC)), or may be two or more heterogeneous communications interface devices (for example, an NIC and a host bus adapter (HBA)).

In the following description, a "memory" is one or more memory devices that are an example of one or more storage devices, and may typically be a main storage device. The at least one memory device in the memory may be a volatile memory device or a non-volatile memory device.

In the following description, a "storage device" may be one or more permanent storage devices that are an example of one or more storage devices. The permanent storage device may typically be a nonvolatile storage device (for example, an auxiliary storage device), and may specifically be, for example, a hard disk drive (HDD), a solid state drive (SSD), or a non-volatile memory express (NVMe) drive.

In addition, in the following description, a "processor" may be one or more processor devices. The at least one processor device may typically be a microprocessor device such as a central processing unit (CPU), but may be another type of processor device such as a graphics processing unit (GPU). The at least one processor device may be single-core or multi-core. The at least one processor device may be a processor core. The at least one processor device may be a processor device in a broad sense, such as a hardware circuit (for example, a field-programmable gate array (FPGA), a complex programmable logic device (CPLD), or an application specific integrated circuit (ASIC)) that performs some or all of the processes.

In addition, in the following description, information from which an output is obtained with respect to an input will be described with an expression such as "xxx table", but the information may be data of any structure (for example, it may be structured data or unstructured data), or may be a learning model represented by a neural network, a genetic algorithm, or a random forest that generates an output with respect to an input. Therefore, the "xxx table" can be referred to as "xxx information". Furthermore, in the following description, the configuration of each table is an example, and one table may be divided into two or more tables, or all or a part of two or more tables may be one table.

In addition, in the following description, there is a case where process is described with a "program" as a subject, but the subject of the process may be a processor (alternatively, a device such as a controller having the processor) since the program is executed by the processor to perform a defined process appropriately using a storage device and/or an interface device. The program may be installed in a device such as a calculator from a program source. The program source may be, for example, a program distribution server or a calculator-readable (for example, non-transitory) recording medium. In the following description, two or more programs may be implemented as one program, or one program may be implemented as two or more programs.

In addition, in the following description, in a case where the same type of elements are described without being distinguished, a common portion (portion excluding the branch number) of reference numerals including the branch number is used, and in a case where the same type of elements are described while being distinguished, a reference numeral including the branch number is used. For example, in a case where the nodes are described without being particularly distinguished, the nodes are described as "node xx" (xx is an integer of greater than or equal to 0), and in a case where the individual nodes are described while being distinguished, the nodes may be described as "node xx A" and "node xx B". In addition, an ID (for example, an identification number) of an element may be used as another description method when describing the same type of element in a distinguished manner. Specifically, for example, the above-described "node xx A" and "node XX B" may be described as "node 1" and "node 2", respectively.

(1) CONFIGURATION OF STORAGE SYSTEM ACCORDING TO PRESENT EMBODIMENT

In FIG. 1, reference numeral 1 indicates a storage system according to the present embodiment as a whole. In the present storage system 1, a primary site 2 and a secondary site 3 are connected via a first network 4 including a wide area network (WAN) such as the Internet, and a pair management device 5 installed at a place other than the primary site 2 and the secondary site 3 is connected to the first network 4.

One or a plurality of host devices 10, one or a plurality of first storage nodes 11, and a primary site management device 12 are installed in the primary site 2, and are connected to each other via a second network 13 such as Ethernet.

Figure 3:
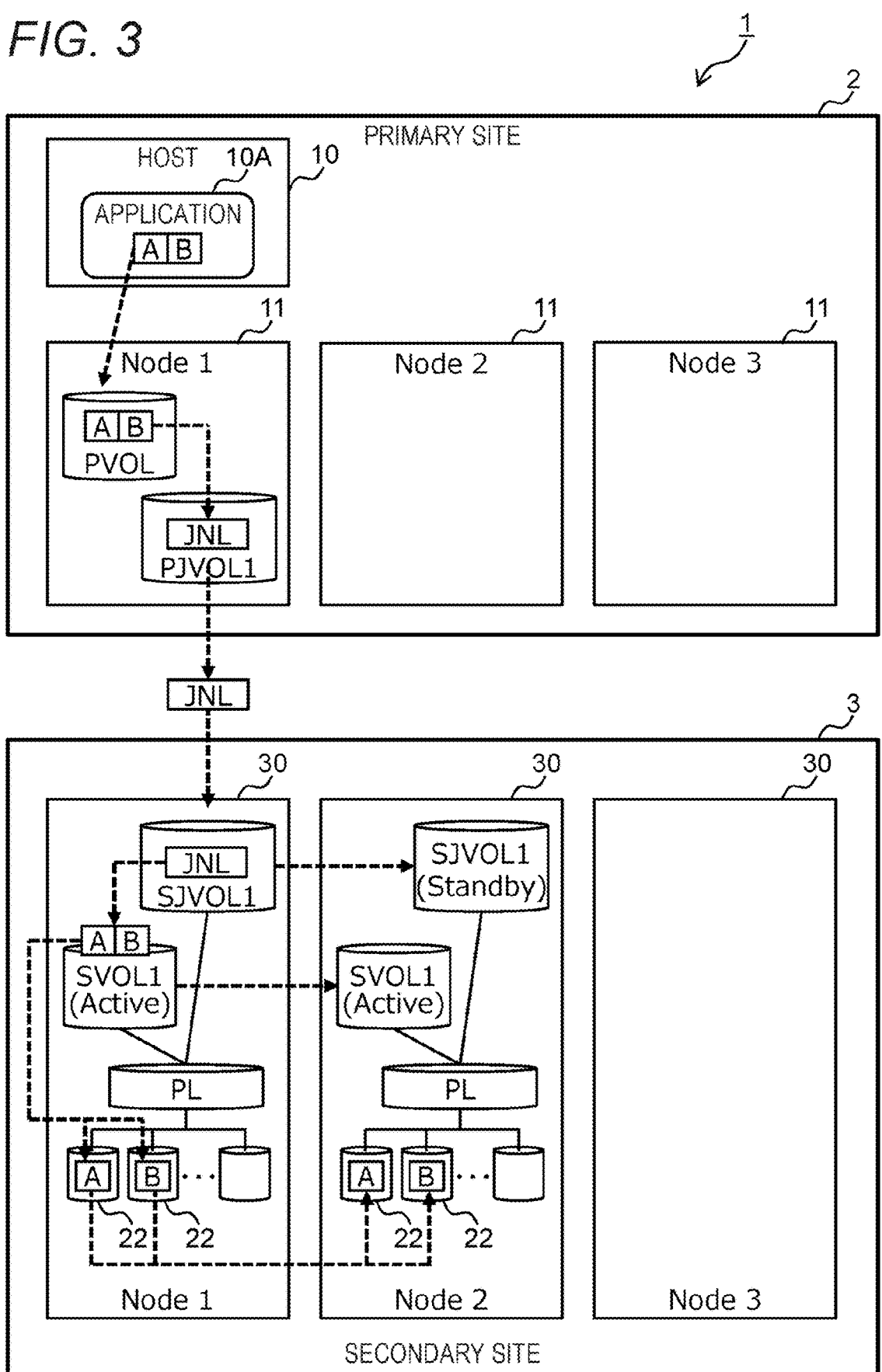
FIG. 3 is a block diagram illustrating a flow of data copy from a primary volume to a secondary volume.

A host device 10 is a general-purpose computer device that functions as a high-rank device for the first storage node 11. However, the host device 10 may be a virtual computer device such as a virtual machine. The host device 10 reads and writes data from and to the first storage node 11 via the second network 13 according to a user operation or a request from a mounted application program 10A (FIG. 3).

The first storage node 11 is a server device that provides a storage area for reading and writing data with respect to the host device 10, and includes a control unit 21, a plurality of storage devices 22, and one or a plurality of ports 23 connected to one another via an internal bus 20.

The control unit 21 includes one or more processors 24 and one or more memories 25. The processor 24 is a device having a function of controlling the operation of the entire first storage node 11, and includes a central processing unit (CPU), a micro processing unit (MPU), and the like.

In addition, the memory 25 includes, for example, a volatile semiconductor memory or a nonvolatile semiconductor memory such as a static random access memory (SRAM) or a dynamic random access memory (DRAM), and is used to temporarily store various programs and necessary data. When the processor 24 executes the program stored in the memory 25, various processes are executed as the entire first storage node 11 as described later.

The storage device 22 includes a large-capacity nonvolatile storage device such as an HDD, an SSD, or an NVMe. The storage device 22 provides a physical storage area for reading and writing data from and to the host device 10. The port 23 is interface hardware for connecting the first storage node 11 to the second network 13.

The primary site management device 12 is configured by a general-purpose computer device including information processing resources such as a processor and a memory. The primary site management device 12 manages each of the first storage nodes 11 arranged at the primary site 2 based on the implemented primary site management software (hereinafter referred to as primary site management software) 26.

In the secondary site 3, a plurality of second storage nodes 30 and the secondary site management device 31 are installed, and are connected to each other via a third network 32 such as Ethernet. The second storage node 30 is a server device that provides a storage area for backing up data written to the first storage node 11. Since the second storage node 30 has a configuration similar to that of the first storage node 11, a detailed description thereof will be omitted here.

The second storage node 30 of the secondary site 3 is grouped and managed in a group called a cluster 33 together with other one or a plurality of second storage nodes 30. In the example of FIG. 1, a case where only one cluster 33 is set in the secondary site 3 is illustrated, but a plurality of clusters 33 may be set in the secondary site 3.

The secondary site management device 31 is configured by a general-purpose computer device including information processing resources such as a processor and a memory. The secondary site management device 31 manages each of the second storage nodes 30 arranged in the secondary site 3 based on the implemented secondary site management software (hereinafter referred to as secondary site management software) 34.

The pair management device 5 is also configured by a general-purpose computer device or the like including information processing resources such as a processor and a memory. The pair management device 5 performs a process such as setting and deletion of the remote copy path 7 (FIG. 2) between the first storage node 11 in the primary site 2 and the second storage node 30 in the secondary site 3 based on the implemented pair management software (hereinafter referred to as pair management software) 6.

Figure 2:
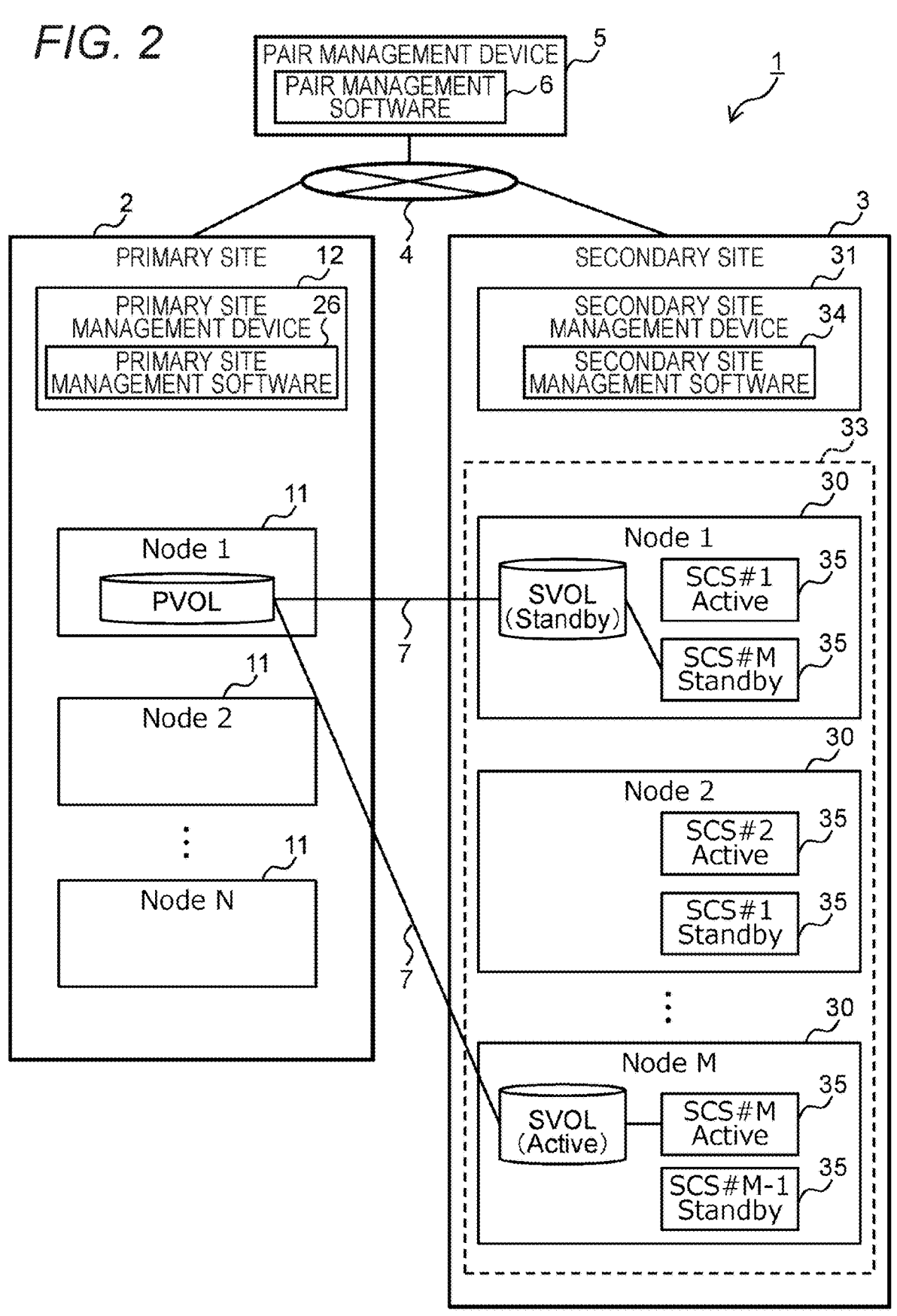
FIG. 2 is a block diagram illustrating a logical configuration of the storage system.

FIG. 2 is a block diagram illustrating a logical configuration of the storage system 1. As illustrated in FIG. 2, one or a plurality of primary volumes PVOL to be provided to the host device 10 (FIG. 1) as a storage area for reading and writing data is created in each first storage node 11 in the primary site 2. In addition, in each of the first storage nodes 11, one or a plurality of storage control software 35 to be described later that manages these primary volumes PVOL is also arranged.

On the other hand, one or a plurality of storage control software 35 is arranged in each of the second storage nodes 30 of the secondary site 3. The storage control software 35 is software that functions as a storage controller of the SDS as described above. Each storage control software 35 is managed as one group (hereinafter referred to as a redundancy group) for redundancy together with the storage control software 35 arranged in other one or a plurality of second storage nodes 30 different from each other.

In the redundancy group, one storage control software 35 is set to a state (a state of a currently used system, hereinafter referred to as an active mode) in which an input/output (I/O) request from the first storage node 11 in the primary site 2 can be accepted, and the remaining storage control software 35 is set to a state (a state of a standby system, hereinafter referred to as a standby mode) in which an I/O request from the first storage node 11 cannot be accepted.

For example, FIG. 2 illustrates an example in which a redundancy group is configured by the storage control software 35 called "SCS #M" arranged in the second storage node 30 called "Node 1" and the storage control software 35 called "SCS #M" arranged in the second storage node 11 called "Node M", where one of the storage control software 35 arranged in the second storage node 11 called "Node M" is set to the active mode ("Active"), and the other arranged in the second storage node 11 called "Node 1" is set to the standby mode ("Standby").

In the other drawings, each storage control software 35 written as "SCS #X" arranged in the different second storage node 30 is the storage control software 35 configuring the same redundancy group "X", and among the storage control software, the storage control software 35 written as "Active" represents the storage control software 35 in the active mode, and the storage control software 35 written as "Standby" represents the storage control software 35 in the standby mode.

In the redundancy group, when a failure occurs in the storage control software 35 in the active mode or the second storage node 30 on which the storage control software 35 operates, the state of the storage control software 35 that has been set to the standby mode is switched to the active mode. As a result, when the storage control software 35 set to the active mode cannot be operated, the I/O processing executed by the storage control software 35 can be taken over by the storage control software 35 that has been set to the standby mode until then (fail-over function).

In order to realize such a fail-over function, the storage control software 35 belonging to the same redundancy group always holds configuration information of the same content. The configuration information is information necessary for the storage control software 35 to execute processes related to various functions such as a remote copy function for copying data to a remote location in a synchronous or asynchronous manner for disaster countermeasures, such as mapping information for associating a storage area of the secondary volume SVOL with a storage area of the storage device 22 (FIG. 1), a capacity virtualization function for virtualizing a storage capacity of each storage device 22 (FIG. 1) mounted on the second storage node 30, a hierarchical storage control function for moving data having a high access frequency to a storage area having a higher response speed, a deduplication function for deleting duplicated data from stored data, a data compression function for compressing and storing data, and a snapshot function for holding a state of data at a certain time point.

Then, when the configuration information of the storage control software 35 in the active mode configuring the redundancy group is updated, a difference between the configuration information of before and after the update is transferred to the other storage control software 35 configuring the redundancy group as differential data, and the configuration information held by the storage control software 35 is updated by the other storage control software 35 based on the differential data. As a result, the configuration information held by each storage control software 35 constituting the redundancy group is always maintained in a synchronized state.

As described above, all the storage control software 35 constituting the redundancy group always hold the configuration information having the same contents, and thus, even in a case where a failure occurs in the storage control software 35 set to the active mode or the second storage node 30 in which the storage control software 35 is arranged, or the second storage node 30 is removed, the process executed by the storage control software 35 until then can be immediately taken over by another storage control software 35 constituting the same redundancy group as the storage control software 35.

On the other hand, in the secondary site 3, a secondary volume SVOL is created in the second storage node 30 in association with each primary volume PVOL created in the primary site 2. The secondary volume SVOL is a logical volume for backing up data stored in the corresponding primary volume PVOL.

Each secondary volume SVOL corresponding to one primary volume PVOL is created in the second storage node 30 in which the storage control software 35 is arranged in association with each storage control software 35 constituting the same redundancy group.

Therefore, in a case where the redundancy group is configured by two pieces of storage control software 35 as illustrated in FIG. 2, two secondary volumes SVOL are created in different second storage nodes 30 in the secondary site 2 with respect to one primary volume PVOL, and these secondary volumes SVOL are respectively associated with the storage control software 35 configuring the same redundancy group.

In addition, a remote copy path 7 is set between the first storage node 11 of the primary site 2 in which the primary volume PVOL is provided and each second storage node 30 in which the secondary volume SVOL is created in correspondence with the primary volume PVOL.

Then, the data written in the primary volume PVOL is transferred to the second storage node 30 via the remote copy path 7, among the remote copy paths 7, connecting the first storage node 11 in which the primary volume PVOL is created and the second storage node 30 in which the secondary volume SVOL associated with the storage control software 35 in the active mode among the corresponding secondary volumes SVOL is created.

Furthermore, the data transferred to the second storage node 30 is then stored in the secondary volume SVOL created in association with the primary volume PVOL in the second storage node 30 under the control of the storage control software 35 in the active mode.

Furthermore, the data is transferred from the second storage node 30 in which the storage control software 35 in the active mode is arranged to each second storage node 30 in which each storage control software 35 in the standby mode constituting the same redundancy group as the storage control software 35 is arranged via the third network 32 (FIG. 1). Then, the data is also stored in the secondary volume SVOL created in correspondence with the primary volume PVOL under the control of the storage control software 35 in the second storage node 30.

In the following description, the storage control software 35 in the active mode is appropriately referred to as active storage control software 35, and the storage control software 35 in the standby mode is appropriately referred to as standby storage control software 35. In addition, the secondary volume SVOL managed by the active storage control software 35 is appropriately referred to as an active secondary volume SVOL, and the secondary volume SVOL managed by the standby storage control software 35 is appropriately referred to as a standby secondary volume SVOL.

Furthermore, in the following description, a combination of the primary volume PVOL and the secondary volume SVOL created in correspondence with the primary volume PVOL is referred to as a volume pair. In a case where a plurality of secondary volumes SVOL are created by redundancy with respect to the primary volume PVOL, each of the combinations of the primary volume PVOL and these secondary volumes SVOL is a volume pair.

FIG. 3 illustrates a specific flow of remote copy of data from the primary volume PVOL to each corresponding secondary volume SVOL as described above. In the case of the storage system 1 of the present embodiment, the remote copy between the primary volume PVOL and the secondary volume SVOL is performed asynchronously with the timing at which the host device 10 writes data to the primary volume PVOL.

In practice, in the case of the present storage system 1, in each of the first storage nodes 11 in which the primary volume PVOL to be backed up in the primary site 2 is created, a logical volume called a journal volume PJVOL is created in correspondence with the primary volume PVOL. Hereinafter, the journal volume PJVOL is referred to as a primary journal volume PJVOL. One primary journal volume PJVOL may be created for one primary volume PVOL, or may be created for a plurality of primary volumes PVOL.

In addition, journal volumes SJVOL are also created in association with the respective secondary volumes SVOL in the respective second storage nodes 30 of the secondary site 3 in which the respective secondary volumes SVOL created in association with the primary volume PVOL are created. Hereinafter, the journal volume SJVOL is referred to as a secondary journal volume SJVOL. One secondary journal volume SJVOL may be created for one secondary volume SVOL, or may be created for a plurality of secondary volumes SVOL.

The secondary journal volume SJVOL and the secondary volume SVOL are created by cutting out from a storage area called a pool PL in which storage areas provided by the respective storage devices 22 mounted on the second storage node are gathered. The same applies to the primary journal volume PJVOL and the primary volume PVOL.

Then, when the host device 10 writes data ("A" and "B" in FIG. 3) to the primary volume PVOL, metadata such as the position where the data is written in the primary volume PVOL, the data length and the sequence number of the data, and the like are added to the data to generate journal data JNL, and the generated journal data JNL is written to the primary journal volume PJVOL associated with the primary volume PVOL.

Furthermore, the journal data JNL written to the primary journal volume PJVOL is transmitted to the second storage node 30 in which the active secondary volume SVOL corresponding to the primary volume PVOL is created at a predetermined timing such as, for example, when the load of the first storage node 11 is low, and thereafter, is stored in the secondary journal volume SJVOL created in the second storage node 30 in association with the active secondary volume SVOL.

Then, the journal data JNL stored in the secondary journal volume SJVOL is read from the secondary journal volume SJVOL by the active storage control software 35 having the ownership of the active secondary volume SVOL. Then, the active storage control software 35 removes the metadata from the read journal data JNL to extract only the data written in the corresponding primary volume PVOL and store the extracted data in the active secondary volume SVOL.

Specifically, the active storage control software 35 acquires the position where the data is written in the corresponding primary volume PVOL included in the metadata removed from the journal data JNL. In addition, the active storage control software 35 specifies the storage device 22 providing the storage area at the position on the active secondary volume SVOL constituting the volume pair with the primary volume PVOL, and writes the data to the storage device 22.

Furthermore, the active storage control software 35 transfers the journal data JNL stored in the secondary journal volume SJVOL to the standby storage control software 35 associated with the standby secondary volume SVOL in each second storage node 30 in which the standby secondary volume SVOL created in association with the primary volume PVOL exists. Then, the standby storage control software 35 that has received the journal data stores the received journal data in the secondary journal volume SJVOL associated with the standby secondary volume SVOL.

In addition, the active storage control software 35 transfers the data stored in the active secondary volume SVOL as described above (the data written in the corresponding primary volume PVOL) to the standby storage control software 35 associated with the standby secondary volume SVOL in each of the second storage nodes 30 in which the corresponding standby secondary volume SVOL exists. At this time, the active storage control software 35 associated with the active secondary volume SVOL also notifies the position where the data is written in the active secondary volume SVOL.

Thus, the standby storage control software 35 that has received the data stores the received data in the standby secondary volume SVOL. Specifically, the standby storage control software 35 specifies a storage device 22 providing a storage area at a position (a position where the data is written in the corresponding primary volume PVOL) notified from the active storage control software 35 associated with the active secondary volume SVOL on the standby secondary volume SVOL, and writes the data in the storage device 22. As a result, such data is made redundant on the secondary site 3 side.

(2) PATH MANAGEMENT FUNCTION ACCORDING TO THE PRESENT EMBODIMENT (2-1) Overview of Path Management Function According to the Present Embodiment Next, a path management function in the storage system 1 will be described. The path management function is a function of, when the second storage node 30 is increased/decreased in the secondary site 3, resetting a new remote copy path 7 to the second storage node 30 of a rearrangement destination between the storage control software 35 rearranged accordingly and the secondary volume SVOL of which the storage control software 35 has the ownership, and deleting the corresponding original remote copy path 7 that has been set to the second storage node 30 of a rearrangement source.

Hereinafter, transferring the storage control software 35 and the secondary volume SVOL from a certain second storage node 30 to another second storage node 30 is referred to as "rearrangement" or "movement". Hereinafter, "rearrangement" and "movement" are used interchangeably.

Figure 4:
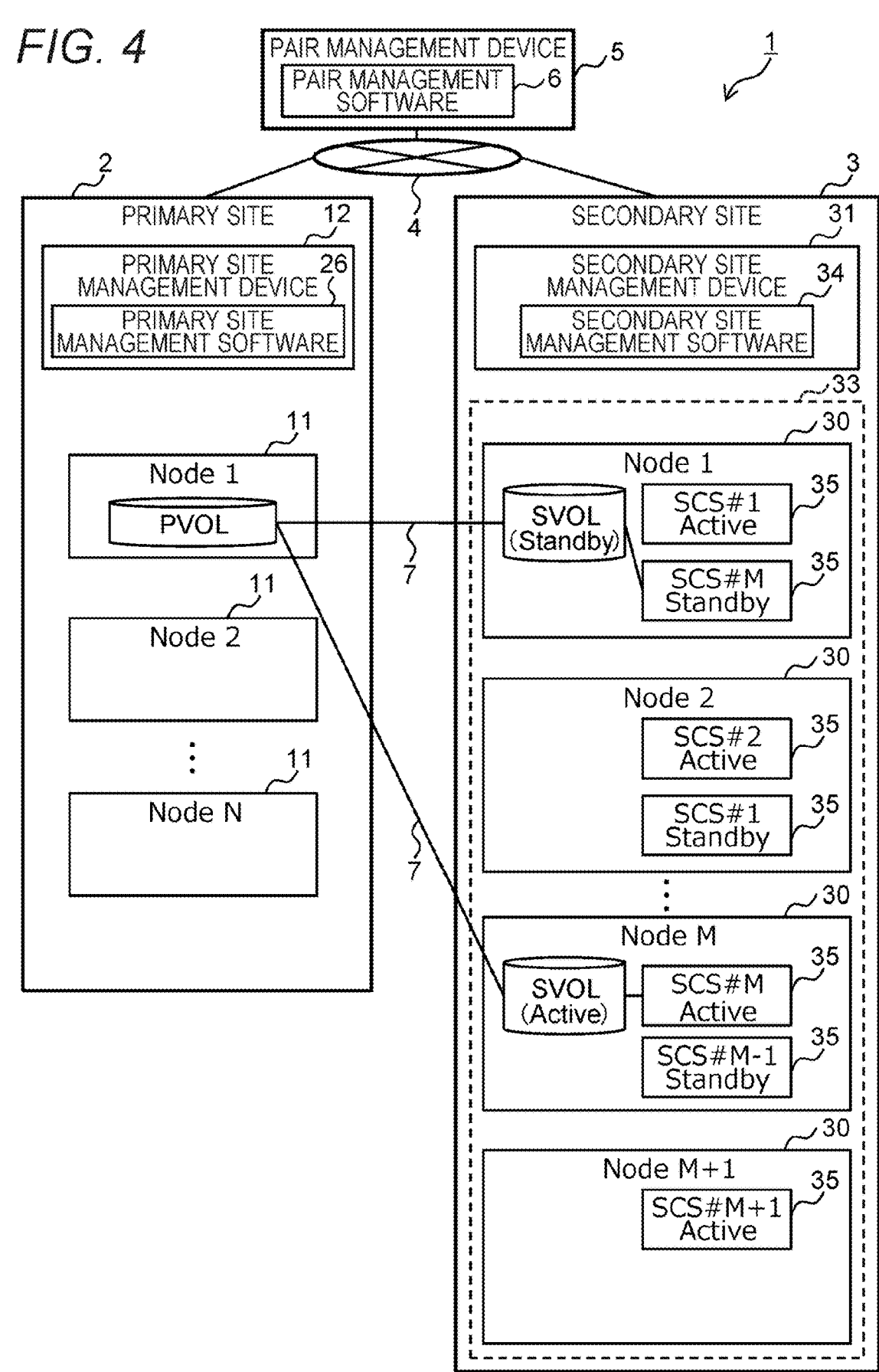
FIG. 4 is a block diagram provided for describing an outline of a pair management function according to the present embodiment.

For example, when the second storage node 30 of "M+1" is increased as illustrated in FIG. 4 with respect to the cluster 33 (FIG. 1) of the secondary site 3 having the configuration illustrated in FIG. 2, the active storage control software 35

("SCS #M+1 Active" in FIG. 4) is arranged in the increased second storage node (increased storage node) 30.

By the way, when the number of storage control software 35 configuring the redundancy group in the cluster 33 is "2" (when the redundancy degree in the cluster 33 is "2"), it is necessary to arrange the active storage control software 35 arranged in the increased storage node 30 and one standby storage control software 35 configuring the redundancy group in any second storage node 30 other than the increased storage node 30 in the cluster 33.

In this case, in consideration of load balancing of each of the second storage nodes 30 in the secondary site 3, the number of storage control software 35 arranged in each of the second storage nodes 30 is preferably the same among the second storage nodes 30.

Figure 5:
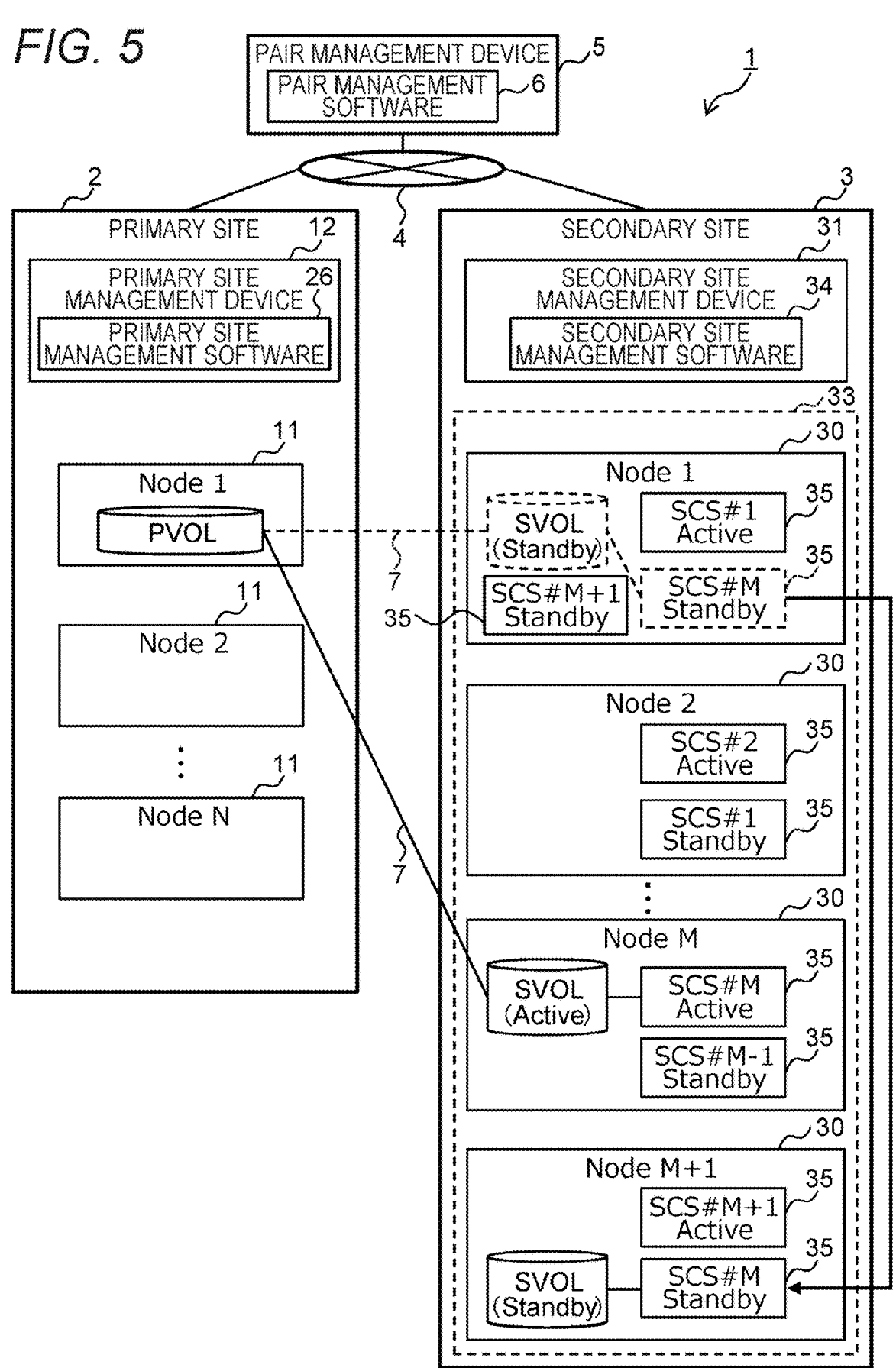
FIG. 5 is a block diagram provided for describing an outline of a path management function according to the present embodiment.

Therefore, in the present embodiment, when arranging the active storage control software 35 arranged in the increased storage node 30 and the one or more standby storage control software 35 configuring the redundancy group in the other second storage node 30, as illustrated in FIG. 5, the existing standby storage control software 35 ("SCS #M Standby" in FIG. 5) arranged in any of the second storage nodes 30, the standby secondary volume SVOL for which the standby storage control software 35 has the ownership, and the configuration information thereof are rearranged in the increased storage node 30, and then the active storage control software 35 arranged in the increased storage node 30 and the standby storage control software 35 ("SCS #M+1 Standby" in FIG. 5) configuring the redundancy group are arranged in the second storage node 30.

In such a state, when a failure occurs in the active storage control software 35 configuring the same redundancy group as the standby storage control software 35 (hereinafter referred to as rearrangement storage standby control software 35) rearranged in the increased storage node 30 or the second storage node 30 in which the active storage control software 35 is arranged, the corresponding first storage node 11 in the primary site 2 thereafter starts to transmit the journal data JNL to the second storage node 30 ("Node 1" in FIG. 5) of the rearrangement source in which the secondary volume SVOL, for which the rearrangement standby storage control software 35 has the ownership, was arranged before the rearrangement.

However, since the rearrangement standby storage control software 35 and the secondary volume SVOL owned by the rearrangement standby storage control software 35 do not already exist in the second storage node 30 of the rearrangement source, the journal data JNL is transferred to the increased storage node 30 serving as the rearrangement destination of the rearrangement standby storage control software 35 via the third network 32 (FIG. 1).

However, when such transfer occurs, there is a problem that the response on the secondary site 3 side with respect to the remote copy between the primary site 2 and the secondary site 3 is delayed, and furthermore, an extra load for the transfer of the journal data JNL is generated in the second storage node 30 of the rearrangement source of the rearrangement standby storage control software 35.

Figure 6:
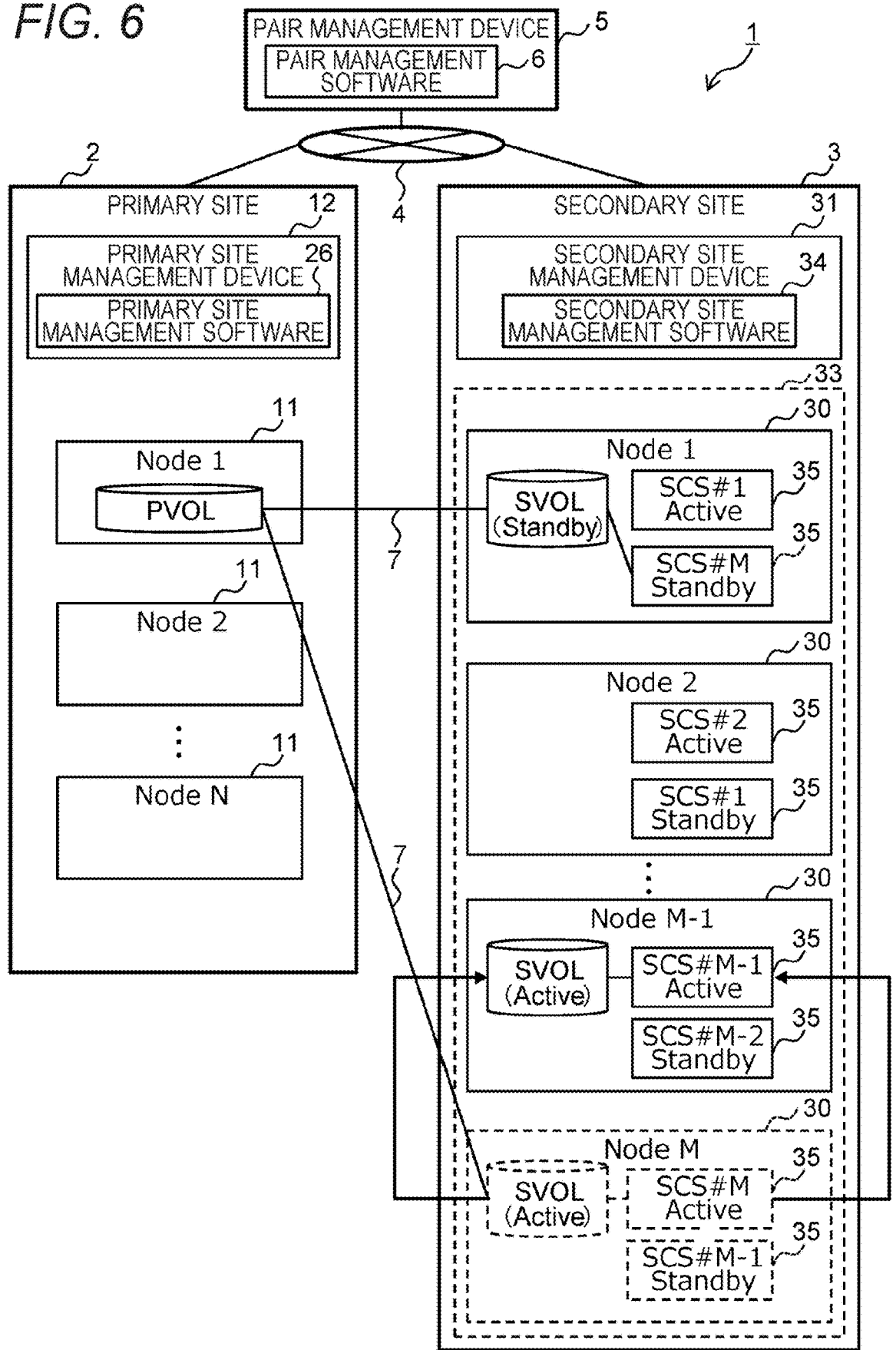
FIG. 6 is a block diagram provided for describing an outline of the path management function according to the present embodiment.

On the other hand, for example, as illustrated in FIG. 6, when the second storage node 30 of "M" is decreased from the cluster 33 of the secondary site 3 having the configuration illustrated in FIG. 2, it is necessary to rearrange the storage control software 35 ("SCS #M Active" and "SCS #M−1 Standby" in FIG. 6) existing in the second storage node (decreased storage node) 30 to another second storage node 30 and move the secondary volume SVOL managed by the storage control software 35 to the second storage node 30.

Therefore, in the present embodiment, the active secondary volume SVOL for which the active storage control software 35 arranged in the decreased storage node 30 has the ownership is moved to the other second storage node 30, and the ownership of the active secondary volume SVOL is transferred from the active storage control software 35 of the decreased storage node 30 to the active storage control software 35 in the second storage node 30 to which the active secondary volume SVOL has been moved. Furthermore, for the standby storage control software 35 arranged in the decreased storage node 30, the standby storage control software 35, the standby secondary volume SVOL for which the standby storage control software 35 has the ownership, and the configuration information thereof are rearranged in any other second storage node 30.

In such a state, in a case where the decreased storage node 30 is actually decreased, the first storage node 11 in which the primary volume PVOL corresponding to the active secondary volume SVOL owned by the active storage control software 35 in the decreased storage node 30 is arranged recognizes that a failure has occurred in the decreased storage node 30. Then, the journal data JNL of the data written in the primary volume PVOL which has been transmitted to the decreased storage node 30 so far is transmitted to the second storage node 30 ("Node 1" in FIG. 6) in which the standby storage control software 35 ("SCS #M Standby" in FIG. 6) constituting the same redundancy group as the active storage control software 35 is arranged.

Therefore, the second storage node 30 that has received the journal data JNL transfers the journal data JNL to the second storage node 30 ("NodeM −1" in FIG. 6) of the rearrangement destination of the active storage control software 35.

However, when such transfer occurs, there is a problem that the response on the secondary site 3 side to the remote copy between the primary site 2 and the secondary site 3 is delayed, and furthermore, an extra load for the transfer occurs in the second storage node 30 that transfers the journal data JNL.

Therefore, in the storage system 1 of the present embodiment, when the second storage node 30 is increased/decreased in the secondary site 3, a new remote copy path 7 is reset to the second storage node 30 of a rearrangement destination between the storage control software 35 rearranged accordingly and the secondary volume SVOL for which the storage control software 35 has the ownership, and the original remote copy path 7 set to the second storage node 30 of the rearrangement source is deleted, thereby suppressing the transfer of the journal data JNL in the secondary site 3 as described above.

In practice, in the storage system 1, when the increased storage node 30 is newly installed on the secondary site 3 side, the secondary site management device 31 gives an instruction to the second storage node 30 of a rearrangement source of the standby storage control software 35 and the increased storage node 30 so as to rearrange (copy) the standby storage control software 35 arranged in any of the second storage nodes 30, the standby secondary volume SVOL for which the standby storage control software 35 has the ownership, and the configuration information thereof to the increased storage node 30.

Note that there is a case where copy or creation of the corresponding secondary journal volume SJVOL is required in the second storage node 30 of the copy destination along with the copy of the secondary volume SVOL between the second storage nodes 30, but for ease of description and understanding, description of copy or creation of the secondary journal volume SJVOL will all be omitted below.

Then, when the rearrangement of the standby storage control software 35 and the standby secondary volume SVOL is completed, the secondary site management device 31 transmits, to the pair management device 5, rearrangement information including information such as the storage control software ID of the standby storage control software 35 of each piece of the rearranged standby storage control software 35, the volume ID of standby secondary volume SVOL for which each piece of the standby storage control software 35 has the ownership, the node ID of the second storage node 30 of the rearrangement source of each piece of the standby storage control software 35, and the node ID of the second storage node (increased storage node) 30 of the rearrangement destination of the standby storage control software 35.

The pair management device 5 that has received the rearrangement information acquires, for each rearranged standby storage control software 35, the IP address of each port 23 included in the first storage node 11 in which the primary volume PVOL corresponding to the standby secondary volume SVOL for which the standby storage control software 35 has the ownership and the storage control software 35 having the ownership of the primary volume PVOL are arranged, and the IP address of each port 23 included in the increased storage node 30 from the primary site management device 12.

Then, based on the acquired information, the pair management device 5 resets the remote copy path 7 for performing remote copy between the standby secondary volume SVOL for which the rearranged standby storage control software 35 has ownership and the primary volume PVOL associated with the standby secondary volume SVOL between the first storage node 11 and the increased storage node 35 in which the standby storage control software 35 is rearranged.

In addition, the pair management device 5 deletes the remote copy path 7 for performing remote copy between the primary volume PVOL and the standby secondary volume SVOL set between the first storage node 11 and the second storage node 30 of the rearrangement source of each standby storage control software 35 rearranged in the increased storage node 30.

On the other hand, when the information indicating to decrease any of the second storage nodes 30 in the secondary site 3 is given from the user, the secondary site management device 31 gives an instruction to the second storage node 30 and the decreased storage node 30 so that the active secondary volume SVOL for which the active storage control software 35 in the second storage node (decreased storage node) 30 has the ownership and its configuration information are moved to the second storage node 30 selected by the secondary site management device 31 other than the decreased storage node 30 and the ownership of the active secondary volume SVOL is transferred to the active storage control software 35 in the second storage node 30.

In addition, the secondary site management device 31 gives an instruction to the second storage node 30 and the decreased storage node 30 to rearrange the standby storage control software 35 arranged in the decreased storage node 30, the standby secondary volume SVOL owned by the standby control software 35, and the configuration information thereof in one or a plurality of second storage nodes 30 selected by the secondary site management device 31 other than the decreased storage node 30.

Then, when the rearrangement of each secondary volume SVOL arranged in the decreased storage node 30 and each storage control software 35 is completed, the secondary site management device 31 transmits, to the pair management device 5, rearrangement information including information such as the storage control software ID of each rearranged storage control software 35 (also include the active storage control software 35 to which the ownership of the active secondary volume SVOL is transferred), the volume ID of each secondary volume SVOL for which each storage control software 35 has or had the ownership, the node ID of the second storage node (decreased storage node) 30 of the rearrangement source of each storage control software 35, the node ID of the second storage node 30 of the rearrangement destination of each storage control software 35 (include transfer of the ownership of the active secondary volume SVOL).

The pair management device 5 that has received the rearrangement information acquires, for each rearranged storage control software 35, the IP address of each port 23 included in the first storage node 11 in which the primary volume PVOL corresponding to the secondary volume SVOL for which the storage control software 35 has the ownership and the storage control software 35 having the ownership of the primary volume PVOL are arranged, and the IP address of each port 23 included in the second storage node 30 of the rearrangement destination of the rearranged storage control software 35 from the primary site management device 12.

Then, based on the acquired information, the pair management device 5 resets the remote copy path 7 for performing remote copy between the active secondary volume SVOL moved from the decreased storage node 30 and the primary volume PVOL corresponding to the active secondary volume SVOL between each of the second storage nodes 30 of the movement destination of the active secondary volume SVOL and the first storage node 11 in which the primary volume PVOL is arranged.

In addition, the pair management device 5 resets the remote copy path 7 for performing remote copy between each standby secondary volume SVOL moved from the decreased storage node 30 and each primary volume PVOL corresponding to each standby secondary volume SVOL between the second storage node 30 of the rearrangement destination of each storage control software 35 and the first storage node 11 in which the corresponding primary volume PVOL is arranged.

Furthermore, the pair management device 5 deletes the remote copy path 7 for performing remote copy between the primary volume PVOL and the active secondary volume SVOL set between the first storage node 11 in which the primary volume PVOL associated with active secondary volume SVOL for which the active storage control software 35 in the decreased storage node 30 has ownership is arranged, and the decreased storage node 30.

Similarly, the pair management device 5 deletes the remote copy path 7 for performing remote copy between each primary volume PVOL and each standby secondary volume SVOL set between each first storage node 11 in which each primary volume PVOL associated with each standby secondary volume SVOL in the decreased storage node 30 is arranged and the decreased storage node 30.

Figure 7:
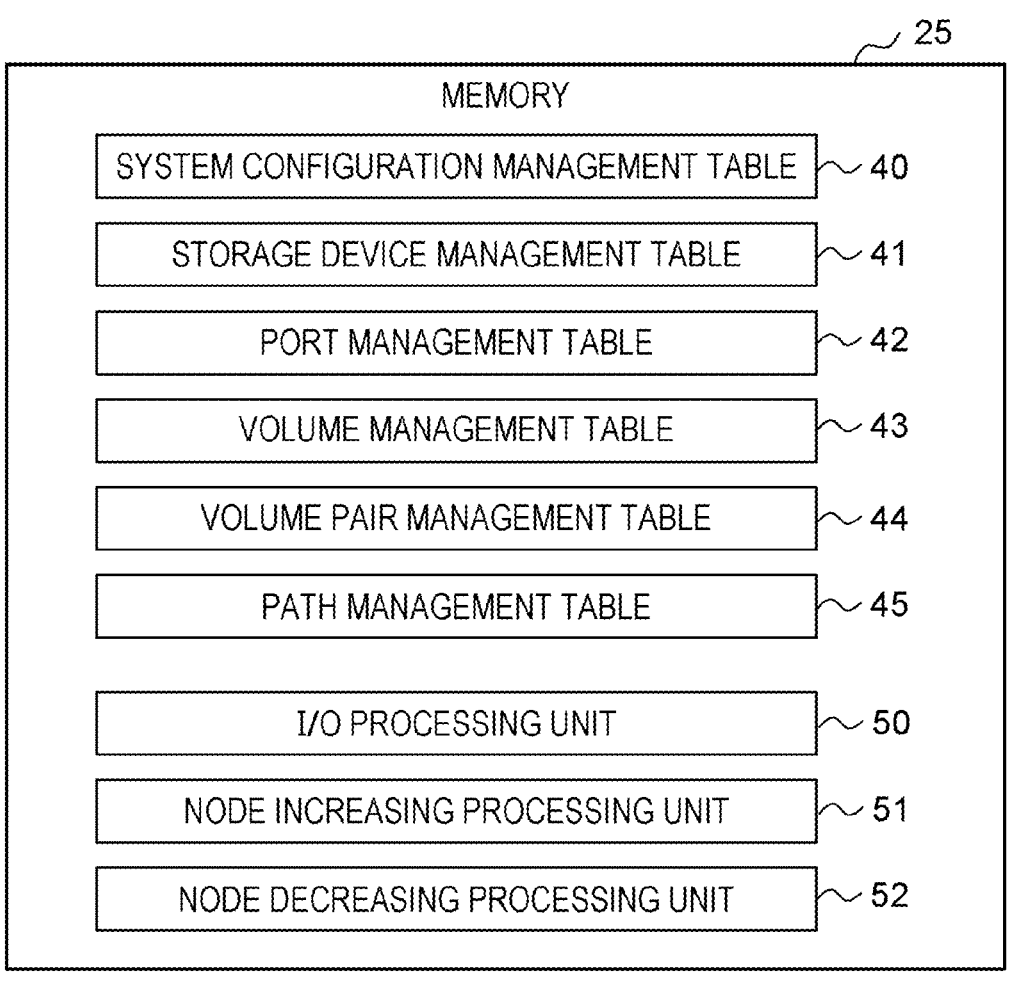
FIG. 7 is a block diagram illustrating various programs and various tables stored in memories of first and second storage nodes as well as a primary site management device and a secondary site management device.

(2-2) Configuration of Table and Program Related to Path Management Function According to the Present Embodiment As a means for realizing the path management function according to the present embodiment as described above, as illustrated in FIG. 7, a system configuration management table 40, a storage device management table 41, a port management table 42, a volume management table 43, a volume pair management table 44, a path management table 45, an I/O processing unit 50, a node increasing processing unit 51, and a node decreasing processing unit 52 are stored in the memory 25 (FIG. 1) of each of the first and second storage nodes 11 and 30.

The primary site management device 12 and the secondary site management device 31 also store a system configuration management table 40, a storage device management table 41, a port management table 42, a volume management table 43, a volume pair management table 44, and a path management table 45 similar to those of the I/O processing unit 50, a node increasing processing unit 51, and a node decreasing processing unit 52.

The system configuration management table 40 is a table for managing all the first and second storage nodes 11 and 30 existing in the storage system 1, and includes a node ID field 40A, a state field 40B, a storage device ID list field 40C, and a port ID list field 40D as illustrated in FIG. 8. In the system configuration management table 40, one record (row) corresponds to any one of the first or second storage nodes 11 and 30 existing in the storage system 1.

Then, in the node ID field 40A, an identifier (node ID) unique to the first or second storage node 11 or 30 in the storage system 1 assigned to the corresponding first or second storage node 11 or 30 is stored. In the state field 40B, the current state of the first or second storage node 11 or 30 is stored. As the state of the first or second storage node 11 or 30, there are "Failure" meaning that a failure has occurred, "Normal" meaning that it is a normal state in which no failure has occurred, and the like.

In the storage device ID list field 40C, all the identifiers (storage device IDs) unique to the respective 22 storage devices 22 (FIG. 1) in the storage system 1 assigned to each storage device 22 mounted on the corresponding first or second storage nodes 11 and 30 are stored. In the port ID list field 40D, all the identifiers (port IDs) unique to the ports 23 (FIG. 1) of the corresponding first or second storage nodes 11 and 30 in the storage system 1 assigned to each of the ports 23 are stored.

Therefore, in the case of the example of FIG. 8, for example, the current state of the first or second storage nodes 11 and 30 to which the node ID of "0" is assigned is normal ("Normal"), and the first or second storage nodes 11 and 30 are mounted with the storage devices 22 to which the storage device IDs of "0", "1", and "2" are assigned, respectively. FIG. 8 also illustrates that the first or second storage nodes 11 and 30 include a port 23 assigned with a port ID of "0" and a port 23 assigned with a port ID of "1".

The storage device management table 41 is a table used to manage the storage devices 22 mounted on the first and second storage nodes 11 existing in the storage system 1, and includes a storage device ID field 41A, a state field 41B, and a size field 41C as illustrated in FIG. 9. In the storage device management table 41, one record corresponds to one storage device 22 mounted on any one of the first or second storage nodes 11 and 30.

Then, the storage device ID of the corresponding storage device 22 is stored in the storage device ID field 41A, and the current state of the storage device 22 is stored in the state field 41B. The state of the storage device 22 includes "Failure" meaning that a failure has occurred, "Normal" meaning that it is a normal state in which no failure has occurred, and the like. In the size field 41C, the capacity of the storage device 22 is stored.

Therefore, in the case of the example of FIG. 9, for example, it is indicated that the current state of the storage device 22 to which the storage device ID of "0" is assigned is normal ("Normal") and the capacity thereof is "1400 GB".

The port management table 42 is a table used to manage the ports 23 included in each of the first and second storage nodes 11 existing in the storage system 1, and includes a port ID field 42A, a state field 42B, and an IP address field 42C as illustrated in FIG. 10. In the port management table 42, one record corresponds to one port 23 included in any of the first or second storage nodes 11 and 30.

Then, the port ID of the corresponding port 23 is stored in the port ID field 42A, and the current state of the port 23 is stored in the state field 42B. The state of the port 23 includes "Failure" meaning that a failure has occurred, "Normal" meaning that it is a normal state in which no failure has occurred, and the like. The IP address of the port 23 is stored in the IP address field 42C.

Therefore, in the case of the example in FIG. 10, for example, it is indicated that the current state of the port 23 to which the port ID of "0" is assigned is normal ("Normal"), and the IP address of the port 23 is "172.12.16.200".

The volume management table 43 is a table used to manage each logical volume created in the storage system 1, and includes a volume ID field 43A, an owner ID field 43B, a backward destination ID field 43C, a size field 43D, an attribute field 43E, and a node ID field 43F as illustrated in FIG. 11. In the volume management table 43, one record corresponds to one logical volume created in the storage system 1.

An identifier (volume ID) unique to the corresponding logical volume in the storage system 1 and assigned to the corresponding logical volume is stored in the volume ID field 43A, and a node ID of the first or second storage node 11 or 30 in which the logical volume is created is stored in the node ID field 43F.

In the owner ID field 43B, an identifier (storage control software ID) of the storage control software 35 having the ownership of the logical volume is stored, and a storage control software ID of the storage control software 35 of the backward destination configuring the same redundancy group together with the storage control software 35 is stored.

Furthermore, the capacity of the corresponding logical volume is stored in the size field 43D, and the attribute of the logical volume is stored in the attribute field 43E. The attributes of the logical volume include "normal VOL" meaning that remote copy is not set for any logical volume of the logical volume, "PVOL" meaning that the logical volume is the primary volume PVOL of the volume pair, "SVOL" meaning that the logical volume is the secondary volume SVOL of the volume pair, and "JNLVOL" meaning that the logical volume is the journal volume.

Therefore, in the case of the example of FIG. 11, for example, it is indicated that a logical volume to which a volume ID of "0" is assigned is a logical volume created in the first or second storage nodes 11 and 30 to which a node ID of "0" is assigned, the capacity thereof is "500 GB", and the attribute thereof is "normal VOL".

In FIG. 11, the logical volume indicates that the storage control software 35 having a storage control software ID of "0" has the ownership, and the storage control software 3 configures the same redundancy group as the storage control software 35 having a storage control software ID of "0".

The volume pair management table 44 is a table used to manage each volume pair defined in the storage system 1, and includes a volume pair ID field 44A, a primary volume ID field 44B, a primary journal volume ID field 44C, a secondary journal volume ID field 44D, a secondary volume ID field 44E, a path ID field 44F, a state field 44G, and an attribute field 44H as illustrated in FIG. 12. In the volume pair management table 44, one record corresponds to one volume pair defined in the storage system 1.

In the volume pair ID field 44A, an identifier (volume pair ID) unique to the corresponding volume pair assigned to the corresponding volume pair in the storage system 1 is stored.

In addition, the volume ID of the primary volume PVOL in the volume pair is stored in the primary volume ID field 44B, and the volume ID of the primary journal volume PJVOL (journal data JNL (FIG. 3) of data stored in the primary volume PVOL is stored) associated with the primary volume PVOL is stored in the primary journal volume ID field 44C.

Furthermore, the secondary journal volume field 44D stores the volume ID of the secondary journal volume SJVOL to be the transfer destination of the journal data JNL stored in the primary journal volume PJVOL, and the secondary volume ID field 44E stores the volume ID of the secondary volume SVOL in the corresponding volume pair.

Furthermore, the path ID field 44F, an identifier (path ID) unique to the remote copy path 7 assigned to the remote copy path 7 used for remote copy of data from the primary volume PVOL in which the volume ID is stored in the primary volume ID field 44B to the secondary volume SVOL in which the volume ID is stored in the secondary volume ID field 44E is stored.

Furthermore, the current state of the corresponding volume pair is stored in the state field 44G. Examples of the state of the volume pair include "Copying" indicating a state in which remote copy is in progress, "Suspend" indicating a state in which remote copy is paused, and "Normal" indicating a normal state but a state in which remote copy is not being performed.

Furthermore, the attribute field 44H stores the attribute of the secondary volume SVOL in the copy pair. The attribute includes "Active" indicating that the corresponding secondary volume SVOL is the active secondary volume SVOL and "Standby" indicating that the secondary volume SVOL is the standby secondary volume SVOL. The first storage node 11 refers to the volume pair management table 44, and transmits the journal data JNL to the corresponding second storage node 30 using the remote copy path 7 connected to the secondary volume SVOL whose attribute of the secondary volume SVOL is "Active".

Therefore, in the case of the example of FIG. 12, for example, the volume pair to which the volume pair ID of "O" is a volume pair in which the logical volume to which the volume ID of "1" is assigned is the primary volume PVOL and the logical volume to which the volume ID of "101" is assigned is the secondary volume SVOL.

In addition, FIG. 12 also illustrates that the data stored in the primary volume PVOL is transmitted from the primary volume PVOL to the secondary volume SVOL through the primary journal volume PJVOL to which the volume ID of "2" is assigned in the primary site 2 and the secondary journal volume SJVOL to which the volume ID of "102" is assigned in the secondary site 3 sequentially.

Furthermore, FIG. 12 also illustrates that the path ID of the remote copy path 7 connecting from the primary volume PVOL to the secondary volume SVOL of the volume pair is "0" and the current state is normal ("Normal").

In addition, in FIG. 12, the secondary volume SVOL of the volume pair to which the volume pair ID of "0" is assigned and the secondary volume SVOL of the volume pair to which the volume pair ID of "1" is assigned are redundant logical volumes since the primary volumes PVOL of these volume pairs are the same (the volume ID of the primary volume PVOL is "1"), and the secondary volume SVOL of the volume pair to which the volume pair ID of "O" is assigned is the active secondary volume SVOL (the attribute of the secondary volume SVOL is "Active").

The path management table 45 is a table used to manage all the remote copy paths 7 set in the storage system 1. In the following description, it is assumed that all remote copy paths are duplicated. As illustrated in FIG. 13, the path management table 45 includes a path ID field 45A, a protocol information field 45B, an IP address field 45C, an access policy field 45D, and a priority path field 45E. In the path management table 45, one record corresponds to one remote copy path 7 set in the storage system 1.

The path ID field 45A stores the path ID of the corresponding remote copy path 7, and the protocol information field 45B stores the protocol with which the remote copy path 7 conforms.

The IP address field 45C is divided into a first path field 45CA and a second path field 45CB so as to correspond to each of two paths (hereinafter referred to as first and second paths) constituting the corresponding remote copy path 7. Then, in the first path field 45CA and the second path field 45CB, the IP address (the IP address represented by "P" in FIG. 13) of the port 23 of the first storage node 11 on the primary site 2 side to which the corresponding first or second path is connected and the IP address (the IP address represented by "S" in the figure) of the port 23 of the second storage node 30 on the secondary site 3 side are stored.

Furthermore, in the access policy field 45D, information indicating how to use the first and second paths constituting the corresponding remote copy path 7 is stored. As a method of using the first and second paths in this case, for example, there are "symmetric" in which both the first and second paths are used while being switched by a method such as round robin "asymmetric" in which only one of the first or second paths is used, and the like. Furthermore, in the priority path field 45E, the IP address of the port 23 on the first storage node 11 side of the first or second path and the IP address of the port 23 of the second storage node 30 used when the access policy is "asymmetric" are stored.

Therefore, in the case of the example of FIG. 13, for example, it is illustrated that the remote copy path 7 to which the path ID "O" is assigned includes a first path connecting the port 23 to which the IP address "172.12.16.202" is assigned of a certain first storage node 11 installed in the primary site 2 and the port 23 to which the IP address "172.12.16.203" is assigned of a certain second storage node 30 installed in the secondary site 3, and a second path connecting the port 23 to which the IP address "172.12.16.302" is assigned of the certain first storage node 11 and the port 23 to which the IP address "172.12.16.303" is assigned of the second storage node. FIG. 13 also illustrates that the remote copy path 7 is a path conforming to "iSCSI", the access policy is "asymmetric", and the first path is a priority path.

Note that since the first and second storage nodes 11 and 30 recognize the communication destination with reference to the path management table 45 held therein, the setting of the remote copy path 7 can be performed by registering necessary information in the path management table 45 (creating a record corresponding to the remote copy path 7), and the deletion of the remote copy path 7 can be performed by deleting the information of the remote copy path 7 stored in the path management table 45 (deleting the record corresponding to the remote copy path 7).

On the other hand, the I/O processing unit 50 is a part of the storage control software 35 mounted on the first and second storage nodes 11 and 30, and has a function of executing the I/O process corresponding to the I/O request in a case where the I/O request (read request or write request) is provided from the host device 10 (FIG. 1) for the first storage node 11, and in a case where the write request of data of the remote copy target is provided from the first storage node 11 for the second storage node 30.

In practice, when a data read request is given from the host device 10 (FIG. 1), the I/O processing unit 50 of the first storage node 11 reads the data from the position where the data to be read designated in the read request in the primary volume PVOL where the data to be read designated in the read request is stored, and transmits the data to the host device 10.

In addition, in a case where a data write request is given from the host device 10, the I/O processing unit 50 of the first storage node 11 writes the data to be written at the position designated in the write request in the primary volume PVOL to which the data to be written designated in the write request is to be written, generates the journal data JNL of the data, stores the generated journal data JNL in the corresponding primary journal volume PJVOL, and further transfers the journal data JNL to the corresponding second storage node 30.

Note that since the processing contents (I/O processing) of the I/O processing unit 50 of the second storage node 30 have already been described, the description thereof will be omitted here.

The node increasing processing unit 51 is a part of the storage control software 35 implemented in the first and second storage nodes 11 and 30 for the first and second storage nodes 11 and 30, and is a part of the primary site management software 26 (FIG. 1) or the secondary site management software 34 (FIG. 1) implemented in the primary site management device 12 and the secondary site management device 31 for the primary site management device 12 and the secondary site management device 31. When the second storage node 30 is increased in the secondary site 3, the node increasing processing unit 51 executes a necessary process among a series of processes performed in the storage system 1 as described above.

The node decreasing processing unit 52 is a part of the storage control software 35 implemented in the first and second storage nodes 11 and 30 for the first and second storage nodes 11 and 30, and is a part of the primary site management software 26 (FIG. 1) or the secondary site management software 34 (FIG. 1) implemented in the primary site management device 12 and the secondary site management device 31 for the primary site management device 12 and the secondary site management device 31. When the second storage node 30 is decreased from the secondary site 3, the node decreasing processing unit 52 executes a necessary process among a series of processes performed in the storage system 1 as described above.

(3) VARIOUS PROCESSES RELATED TO PATH MANAGEMENT FUNCTION OF PRESENT EMBODIMENT

Next, specific processing contents of various processes executed in relation to the path management function of the present embodiment will be described. Note that, in the following description, a processing subject of various processes will be described as a "program", but in practice, it goes without saying that the processor 24 (FIG. 1) in the second storage node 30 or a processor (not illustrated) of the primary site management device 12 or the secondary site management device 31 executes the process based on the program.

(3-1) Secondary Site Management Software Side Storage Node Increasing Process

Figure 14:
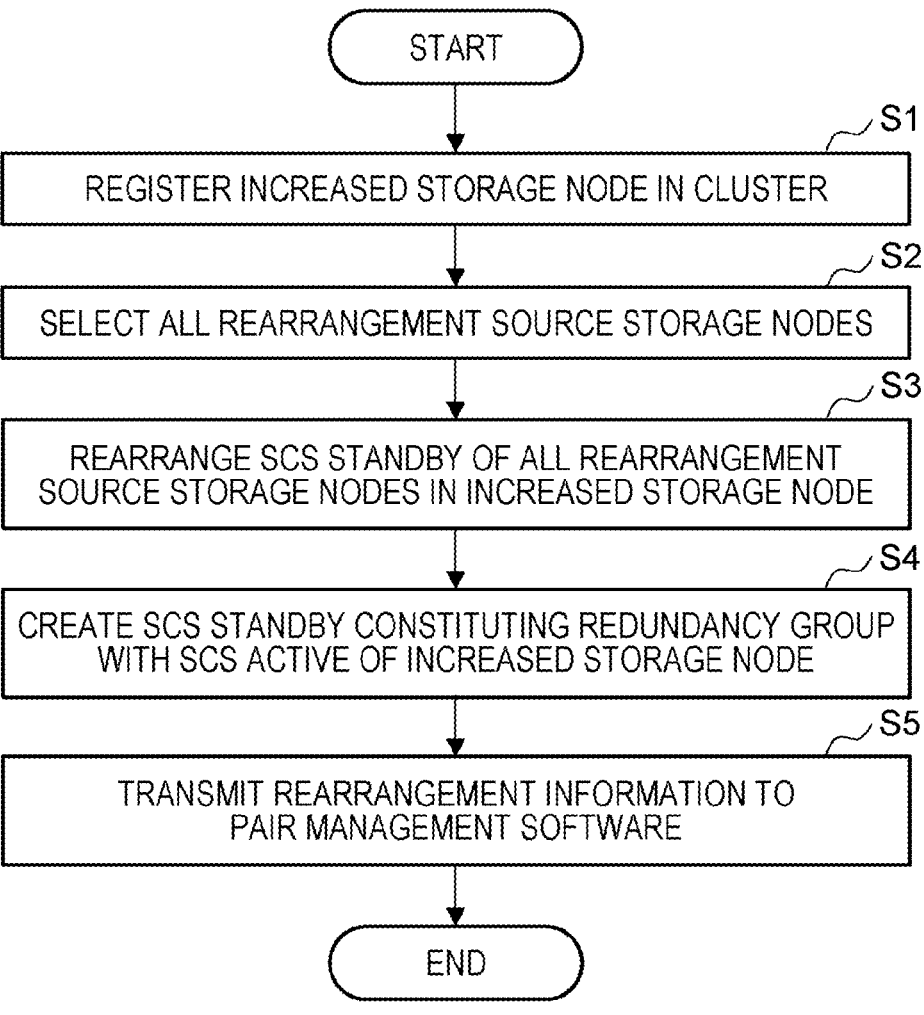
FIG. 14 is a flowchart illustrating a processing procedure of secondary site management software side storage node increasing process.

FIG. 14 illustrates a flow of a series of processes (hereinafter referred to as secondary site management software side storage node increasing process) executed by the secondary site management software 34 of the secondary site management device 31 when a new second storage node 30 is increased to the cluster 33 in the secondary site 3.

Note that in the following description, it is assumed that the active storage control software 35 and the active secondary volume SVOL for which the active storage control software 35 has the ownership are already arranged in the increased storage node 30 by a user operation in advance or the like, and necessary information regarding the increased storage node 30, the active storage control software 35, and the active secondary volume SVOL is already registered in the system configuration management table 40, the storage device management table 41, the port management table 42, and the volume management table 43.

When information indicating that the second storage node 30 is increased in the cluster 33 is provided from the user, for example, by the user performing a predetermined operation on the secondary site management device 31, the secondary site management software 34 starts the secondary site management software side storage node increasing process illustrated in FIG. 14.

Then, the secondary site management software 34 first registers the increased storage node 30 in the cluster 33 of the increased destination (S1). Specifically, the secondary site management software 34 registers and manages information on which second storage node 30 belongs to which cluster 33 in a management table (hereinafter referred to as a cluster management table) not illustrated, and registers information indicating that the second storage node 30 is increased to the cluster 33 in the cluster management table.

Subsequently, the secondary site management software 34 selects the second storage node (hereinafter referred to as a rearrangement source storage node) 30 of a rearrangement source of the standby storage control software 35 (and the standby secondary volume SVOL) to be rearranged in the increased storage node 30 (S2). For example, the secondary site management software 34 refers to the volume management table 43 held therein, determines the standby storage control software 35 having the smallest number of managed secondary volumes SVOL as the standby storage control software 35 to be rearranged, and selects the second storage node 30 in which the standby storage control software 35 is arranged as the rearrangement source storage node 30.

At this time, the secondary site management software 34 selects the rearrangement source storage node 30 to be selected by the number corresponding to the redundancy of the secondary volume SVOL (the number of storage control software 35 constituting the redundancy group). For example, the secondary site management software 34 selects N rearrangement source storage nodes 30 when the redundancy of the secondary volume SVOL is "N".

Next, the secondary site management software 34 rearranges the standby storage control software 35 to be rearranged in each rearrangement source storage node 30 selected as described above in the increased storage node 30, and moves all the standby secondary volumes SVOL in which the rearranged standby storage control software 35 has the ownership in the second storage node 30 of the rearrangement source and the configuration information thereof to the increased storage node 30 (S3).

Specifically, the secondary site management software 34 first gives an instruction to each of the second storage nodes 30 in which each of the standby storage control software 35 to be rearranged is arranged and the increased storage node 30 so as to copy all of the data of each of the standby storage control software 35 to be rearranged, the volume data of all the standby secondary volumes SVOL for which the standby storage control software 35 has the ownership, and the configuration information of the standby secondary volumes SVOL to the increased storage node 30.

In addition, the secondary site management software 34 rewrites the value of the node ID field 43F (FIG. 11) of the record corresponding to each active secondary volume SVOL moved to the increased storage node 30 as described above in the volume management table 43 (FIG. 11) held therein to the node ID of the increased storage node 30.

Then, the secondary site management software 34 transmits differential data indicating the difference of before and after the update in the volume management table 43 updated in this manner to each of the second storage nodes 30 in the secondary site 3. As a result, the contents of the volume management table 43 held by each of the second storage nodes 30 are updated based on the differential data similarly to the volume management table 43 held by the secondary site management software 31.

Note that the secondary site management software 34 also transmits the differential data to the primary site management software 26 of the primary site 2. Then, the primary site management software 26 that has received the differential data updates the volume management table 43 held therein based on the differential data similarly to the volume management table 43 held by the secondary site management software 31.

Furthermore, the secondary site management software 34 transmits differential data indicating the difference of before and after the update in the volume management table 43 updated in this manner to each of the first storage nodes 11 in the primary site 2. As a result, the contents of the volume management table 43 held by each of the first storage nodes 11 are updated based on the differential data similarly to the volume management table 43 held by the primary site management software 26.

Subsequently, the secondary site management software 34 gives an instruction to each second storage node 30 of a rearrangement source of each rearranged standby storage control software 35 to create the standby storage control software 35 configuring the redundancy group together with the active storage control software 35 created in the increased storage node 30 (S4). As a result, the standby storage control software 35 configuring the same redundancy group together with the active storage control software 35 created in the increased storage node 30 is created in each of the second storage nodes 30.

Thereafter, the secondary site management software 34 transmits to the pair management software 6 of the pair management device 5, the storage control software ID of each standby storage control software 35 rearranged in the increased storage node 30 as described above, the volume IDs of all the standby secondary volumes SVOL for which the standby storage control software 35 has the ownership, the node ID of the rearrangement source storage node 30 of the standby storage control software 35, and the node ID of the second storage node (increased storage node) of the rearrangement destination as the rearrangement information (S5).

The secondary site management software 34 thereafter ends the secondary site management software side storage node increasing process.

(3-2) Process of Pair Management Software at Time of Storage Node Increase

Figure 15:
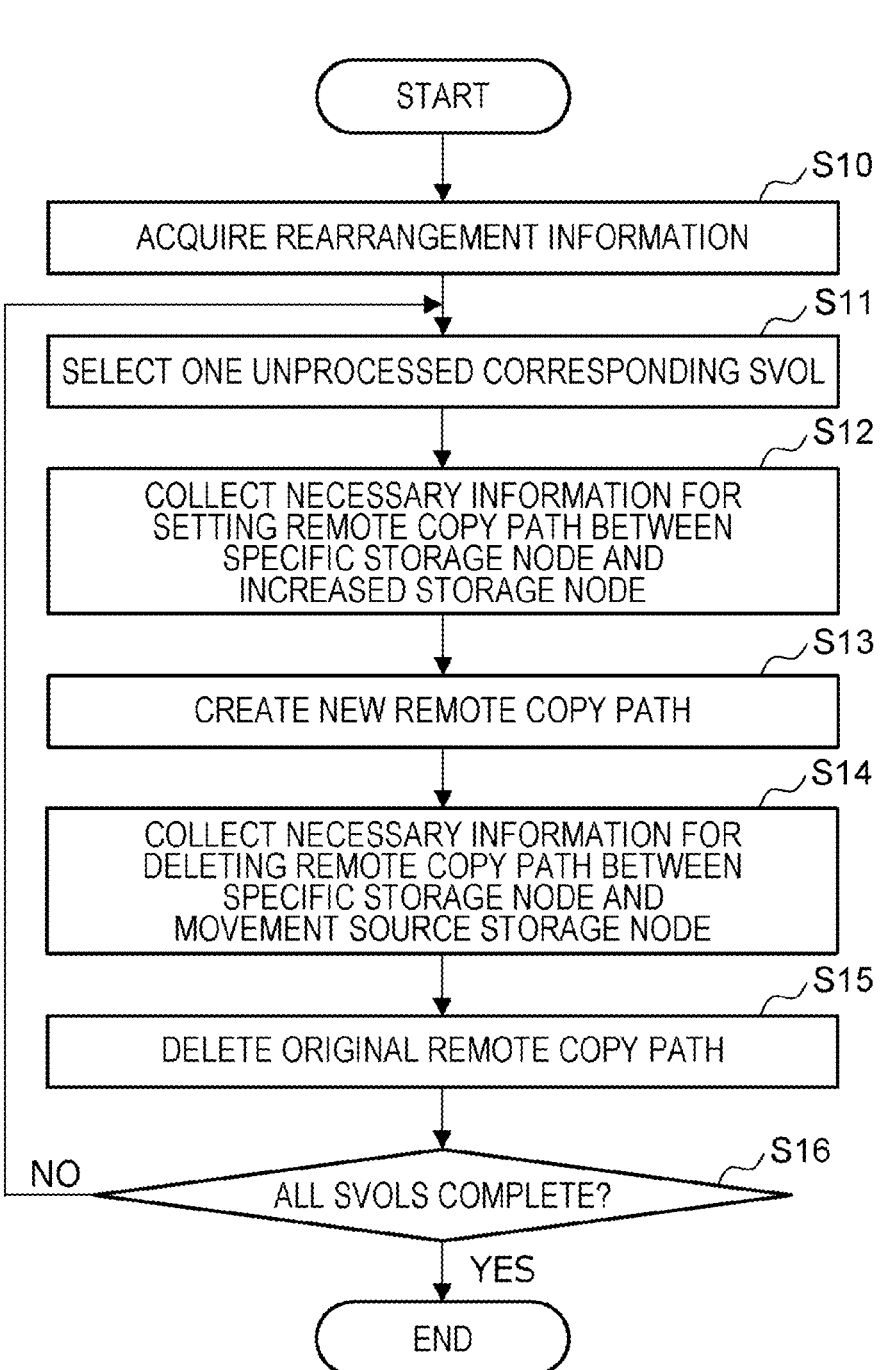
FIG. 15 is a flowchart illustrating a processing procedure of a pair management software side storage node increasing process.

FIG. 15 illustrates a flow of a series of processes (hereinafter referred to as a pair management software side storage node increasing process) executed by the pair management software 6 of the pair management device 5 that has received the rearrangement information described above.

When the rearrangement information is transmitted, the pair management software 6 starts the pair management software side storage node increasing process illustrated in FIG. 15, and first acquires (receives) the transmitted rearrangement information (S10).

Subsequently, the pair management software 6 selects one standby secondary volume SVOL unprocessed after step S12 from among the standby secondary volumes SVOL moved to the increased storage node 30 recognized based on the acquired rearrangement information (S11).

Next, the pair management software 6 collects, from the primary site management device 12, information necessary for setting the remote copy path 7 for performing remote copy between the standby secondary volume (hereinafter referred to as a selected standby secondary volume) SVOL selected in step S11 and the primary volume PVOL corresponding to the selected standby secondary volume SVOL between the first storage node (hereinafter referred to as a specific storage node in the description of FIG. 15) 11 in which the primary volume PVOL is created and the increased storage node 30 (S12).

Specifically, the pair management software 6 designates the volume ID of the selected standby secondary volume SVOL, and inquires the primary site management software 26 of the primary site management device 12 about the volume ID of the primary volume PVOL corresponding to the selected standby secondary volume SVOL and the storage control software ID of the storage control software 35 having the ownership of the primary volume PVOL. In addition, the pair management software 6 inquires the primary site management software 26 of the primary site management device 12 about the IP address of each port 23 included in the specific storage node 11 in which the storage control software 35 is arranged and the IP address of each port 23 included in the increased storage node 30.

The primary site management software 26 that has received this inquiry acquires the volume ID of the primary volume PVOL corresponding to the selected standby secondary volume SVOL from the volume pair management table 44 (FIG. 9) held therein. In addition, the primary site management software 26 acquires the storage control software ID of the storage control software 35 having the ownership of the primary volume PVOL and the node ID of the specific storage node 11 in which the primary volume PVOL is created from the volume management table 43 held therein.

Furthermore, the primary site management software 26 acquires the port ID of each port 23 included in the specific storage node 11 and the port ID of each port 23 included in the increased storage node 30 from the system configuration table 40 (FIG. 5) held therein. Then, the primary site management software 26 acquires the IP addresses of each of the ports 23 of the specific storage node 11 and the increased storage node 30, whose port IDs have been acquired as described above, from the port management table 42 (FIG. 7) held therein. Then, the primary site management software 26 transmits these pieces of information acquired in this way to the pair management software 6.

Subsequently, the pair management software 6 gives an instruction to the primary site management software 26 and the secondary site management software 34 to create the remote copy path 7 connecting the primary volume PVOL, whose volume ID has been acquired in step S12, and the selected standby secondary volume SVOL between the specific storage node 11 and the increased storage node 30 (S13).

Specifically, the pair management software 6 creates two combinations of the IP address of each port 23 of the specific storage node 11 acquired in step S12 and the IP address of each port 23 of the increased storage node 30, and gives an instruction to each of the primary site management software 26 and the secondary site management software 34 to create a path connecting these IP addresses for each combination.

Thus, the primary site management software 26 and the secondary site management software 34 that have received this instruction store the combinations of the IP addresses as the combinations of the IP addresses on both end sides of the first path and the second path in the first and second path fields 45CA and 45CB of the unused record of the path management table 45 (FIG. 13) held therein, respectively, and store necessary information (e.g., information defined by default) in the protocol information field 45B, the access policy field 45D, and the priority path field 45E of the record. The primary site management software 26 and the secondary site management software 34 store the same path ID assigned to the remote copy path 7 in the path ID field 45A of the path management table 45.

Furthermore, the primary site management software 26 and the secondary site management software 34 update the value of the path ID field 44F of the record in which the selected standby secondary volume SVOL in the volume pair management table 44 held therein is stored in the secondary volume ID field 44E (FIG. 12) to the same path ID assigned to the remote copy path 7.

Then, the primary site management software 26 transmits differential data of before and after the update, as described above, of the path management table 45 and the volume pair management table 44 held therein to each of the first storage nodes 11 in the primary site 2, thereby similarly updating the path management table 45 and the volume pair management table 44 held by each of the first storage nodes 11. Then, the secondary site management software 34 transmits differential data of before and after the update, as described above, of the path management table 45 and the volume pair management table 44 held therein to each of the second storage nodes 30 in the secondary site 3, thereby similarly updating the path management table 45 and the volume pair management table 44 held by each of the second storage nodes 30.

As described above, the remote path 7 is set between the specific storage node 11 and the increased storage node 30. Note that the primary site management software 26 and the secondary site management software 34 may further cooperate to create an iSCSI initiator associated with the primary volume PVOL corresponding to the selected standby secondary volume SVOL in the specific storage node 11, create an iSCSI target associated with the selected standby secondary volume SVOL in the increased storage node 30, and perform processes until a session between the iSCSI initiator and the iSCSI target is established.

Next, the pair management software 6 collects, from the primary site management device 12, information necessary for deleting the remote copy path 7 connecting the second storage node (hereinafter referred to as a movement source storage node) 30 of the movement source of the selected standby secondary volume SVOL and the specific storage node 11 (S14). Specifically, the pair management software 6 extracts the node ID of the movement source storage node 30 from the rearrangement information notified from the secondary site management software 34, and inquires the primary site management software 26 about the IP address of each port 23 included in the movement source storage node 30 to which the node ID is assigned.

The primary site management software 26 that has received this inquiry acquires the port ID of each port 23 included in the movement source storage node 30 from the record corresponding to the movement source storage node 30 in the system configuration table 40 (FIG. 5) held therein. Then, the primary site management software 26 acquires the IP address of each port 23 of the movement source storage node 30 that has acquired the port ID in the above manner from the port management table 42 (FIG. 7) held therein. The primary site management software 26 then transmits the acquired IP address of each port 23 of the movement source storage node 30 to the pair management software 6.

The pair management software 26 gives an instruction to the primary site management software 26 and the secondary site management software 34 to delete the remote copy path 7 connecting the specific storage node 11 and the movement source storage node 30 based on the IP address of each port 23 included in the movement source storage node 30 acquired in this manner and the IP address of each port 23 included in the specific storage node 11 acquired in step S12 (S15). Note that this instruction includes information on the IP address of each port 23 included in the specific storage node 11 and information on the IP address of each port 23 included in the movement source storage node 30.

Thus, the primary site management software 26 and the secondary site management software 34 that have received this instruction specify a record in which at least one of the combinations of the IP address of each port 23 included in the specific storage node 11 and the IP address of each port 23 included in the movement source storage node 30 is stored in the first or second path fields 45CA and 45CB from the records of the path management table 45 held therein, and delete the record from the path management table 45.

In addition, the primary site management software 26 transmits differential data of before and after the update as described above of the path management table 45 held therein to each of the first storage nodes 11 in the primary site 2, thereby similarly updating the path management table 45 held by each of the first storage nodes 11. Furthermore, the secondary site management software 34 also transmits differential data of before and after the update as described above of the path management table 45 held therein to each of the second storage nodes 30 in the secondary site 3, thereby similarly updating the path management table 45 held by each of the second storage nodes 30. As described above, the remote path 7 set between the specific storage node 11 and the movement source storage node 30 is deleted.

Thereafter, the pair management software 26 determines whether or not the processes after step S12 have been executed for all the standby secondary volumes SVOL moved to the increased storage node 30 recognized from the rearrangement information notified from the secondary site management software 34 (S16). Then, when a negative result is obtained in this determination, the pair management software 26 returns to step S11, and thereafter, repeats the processes of steps S11 to S16 while sequentially switching the standby secondary volume SVOL selected in step S11 to another corresponding standby secondary volume SVOL which is not processed after step S12.

According to this repetition process, the remote copy path 7 connecting between each standby secondary volume SVOL moved to the increased storage node 30 and the primary volume PVOL corresponding to the standby secondary volume SVOL is sequentially set between the corresponding first storage node 11 and the increased storage node 30, and the remote copy path 7 set between the movement source storage node 30 and the specific storage node 11 of the standby secondary volume SVOL is sequentially deleted.

When obtaining a positive result in step S16 by finishing the execution of the processes of step S12 to step S15 for each standby secondary volume SVOL moved to the increased storage node 30 in due course, the pair management software 6 terminates the pair management software side storage node increasing process.

Figure 16:
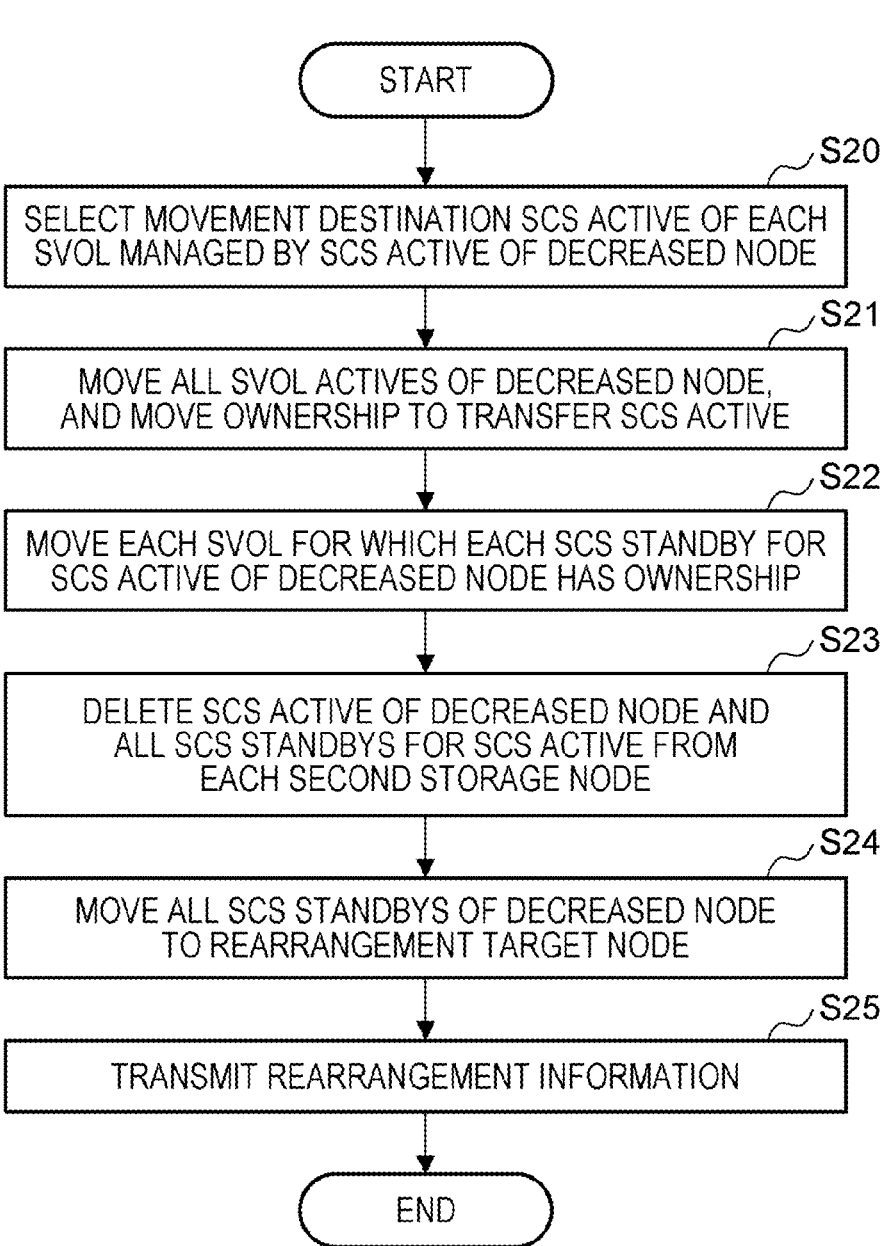
FIG. 16 is a flowchart illustrating a processing procedure of secondary site management software side storage node decreasing process.

(3-3) Process of Secondary Site Management Software at Time of Storage Node Decrease FIG. 16 illustrates a flow of a series of processes (hereinafter referred to as secondary site management software side storage node decreasing process) executed by the secondary site management software 34 of the secondary site management device 31 when decreasing the second storage node 30 from the cluster 33 in the secondary site 3.

When information indicating that the specific second storage node 30 is to be decreased from the cluster 33 is given from the user, for example, by the user performing a predetermined operation on the secondary site management device 31, the secondary site management software 34 starts the secondary site management software side storage node decreasing process illustrated in FIG. 13.

Then, the secondary site management software 34 first selects the active storage control software 35 to which the ownership of all the active secondary volumes SVOL owned by the active storage control software 35 arranged in the decreased storage node 30 is transferred from the active storage control software 35 arranged in the second storage node 30 other than the decreased storage node 30 in the same cluster 33 as the second storage node (decreased storage node) 30 to be decreased (S20).

For example, the secondary site management software 34 selects the active storage control software 35 so that the loads of the second storage nodes 30 other than the decreased storage node 30 in the cluster 33 to which the decreased storage node 30 belongs are balanced. Hereinafter, the active storage control software 35 selected at this time is referred to as transfer destination active storage control software 35.

Subsequently, the secondary site management software 34 moves all the active secondary volumes SVOL owned by the active storage control software 35 arranged in the decreased storage node 30 to the second storage node 30 in which the transfer destination active storage control software 35 selected in step S20 is arranged, and moves the ownership of each of the moved active secondary volumes SVOL to the transfer destination active storage control software 35 (S21).

Specifically, the secondary site management software 34 gives an instruction to the second storage node 30 and the decreased storage node 30 to copy the data of the active secondary volume SVOL and the configuration information of the active secondary volume SVOL to the second storage node 30 in which the transfer destination active storage control software 35 is arranged for each active secondary volume SVOL owned by the active storage control software 35 arranged in the secondary storage node 30.

In addition, the secondary site management software 34 rewrites the storage control software ID stored in the owner ID field 43B (FIG. 11) of the record corresponding to each active secondary volume SVOL moved to the second storage node 30 in which the transfer destination active storage control software 35 is arranged as described above in the volume management table 43 (FIG. 11) held therein to the storage control software ID of the transfer destination active storage control software 35. In addition, the secondary site management software 34 rewrites the value of the node ID field 43F of the record to the node ID of the second storage node 30 in which the transfer destination active storage control software 35 is arranged.

Then, the secondary site management software 34 transmits differential data indicating the difference of before and after the update in the volume management table 43 updated in this manner to each of the second storage nodes 30 in the secondary site 3. As a result, the contents of the volume management table 43 held by each of the second storage nodes 30 are updated based on the differential data similarly to the volume management table 43 held by the secondary site management software 31. As a result, the ownership of each active secondary volume SVOL is transferred to the movement destination active storage control software 35.

Note that the secondary site management software 34 also transmits the differential data to the primary site management software 26 of the primary site 2. Then, the primary site management software 26 that has received the differential data updates the volume management table 43 held therein based on the differential data similarly to the volume management table 43 held by the secondary site management software 31.

Furthermore, the secondary site management software 34 transmits differential data indicating the difference of before and after the update in the volume management table 43 updated in this manner to each of the first storage nodes 11 in the primary site 2. As a result, the contents of the volume management table 43 held by each of the first storage nodes 11 are updated based on the differential data similarly to the volume management table 43 held by the primary site management software 26.

Subsequently, the secondary site management software 34 moves each standby secondary volume SVOL owned by the standby storage control software 35 configuring the same redundancy group as the active storage control software 35 arranged in the decreased storage node 30 and its configuration information to the second storage node 30 in which the standby storage control software 35 configuring the same redundancy group as the transfer destination active storage control software 35 is arranged (S22).

Specifically, the secondary site management software 34 copies each standby secondary volume SVOL and the configuration information thereof to the second storage node 30 in which the standby storage control software 35 configuring same redundancy group as the transfer destination active storage control software 35 is arranged, similarly to step S21.

Thereafter, the secondary site management software 34 moves the ownership of the standby secondary volume SVOL to the standby storage control software 35 (corresponding standby storage control software 35 configuring the same redundancy group as the transfer destination active storage control software 35) in the second storage node 30 of the movement destination in the same manner as described above. Furthermore, the secondary site management software 34 updates the volume management table 43 held by each of the secondary site management device 31, the second storage node 30, the primary site management device 12, and the first storage nodes 11 in response to the update similarly to step S21.

Next, the secondary site management software 34 deletes the active storage control software 35 arranged in the decreased storage node 30 from the decreased storage node 30, and deletes the standby storage control software 35 configuring the same redundancy group as the active storage control software 35 from the second storage node 30 in which the standby storage control software 35 is arranged (S23).

Specifically, the secondary site management software 34 gives an instruction to delete the data of the active storage control software 35 with respect to the decreased storage node 30, and gives an instruction to the second storage node 30 in which the standby storage control software 35 is arranged to delete the data of the standby storage control software 35 constituting the same redundancy group as the active storage control software 35.

Subsequently, the secondary site management software 34 moves all the standby storage control software 35 arranged in the decreased storage node 30, the standby secondary volume SVOL owned by the standby storage control software 35, and the configuration information of the standby secondary volume SVOL to any second storage node 30 other than the decreased storage node 30 in the same cluster 33 (S24).

Specifically, the secondary site management software 34 first determines the second storage node 30 to be the rearrangement destination of each piece of standby storage control software 35 arranged in the decreased storage node 30. The rearrangement destination determines to balance the loads of each of the second storage nodes 30 in the same cluster 33. Then, the secondary site management software 34 gives an instruction to copy the data of the standby storage control software 35, the standby secondary volume SVOL, and the configuration information thereof to each of the determined second storage nodes 30 and the decreased storage node 30.

Thereafter, the secondary site management software 34 rewrites the value stored in the node ID field 43F corresponding to the standby secondary volume SVOL in the volume management table 43 held by each of the secondary site management device 31, the second storage node 30, the primary site management device 12, and the first storage nodes 11 to the node ID of the second storage node 30 of the movement destination of the standby secondary volume SVOL, similarly to step S21, according to the movement of the standby secondary volume SVOL.

Then, the secondary site management software 34 transmits, to the pair management software 6 of the pair management device 5, the storage control software ID of the storage control software 35 rearranged (including the transfer of the ownership) from the decreased storage node 30 to another second storage node 30 as described above, the volume ID of each secondary volume SVOL moved accordingly from the decreased storage node 30 to another second storage node 30 accompanying therewith, the node ID of the second storage node 30 of the rearrangement destination of each rearranged storage control software 35, and the node ID of the decreased storage node 30 as the rearrangement information (S25).

The secondary site management software 34 thereafter ends the secondary site management software side storage node decreasing process.

(3-4) Process of Pair Management Software at Time of Storage Node Decrease

Figure 17A:
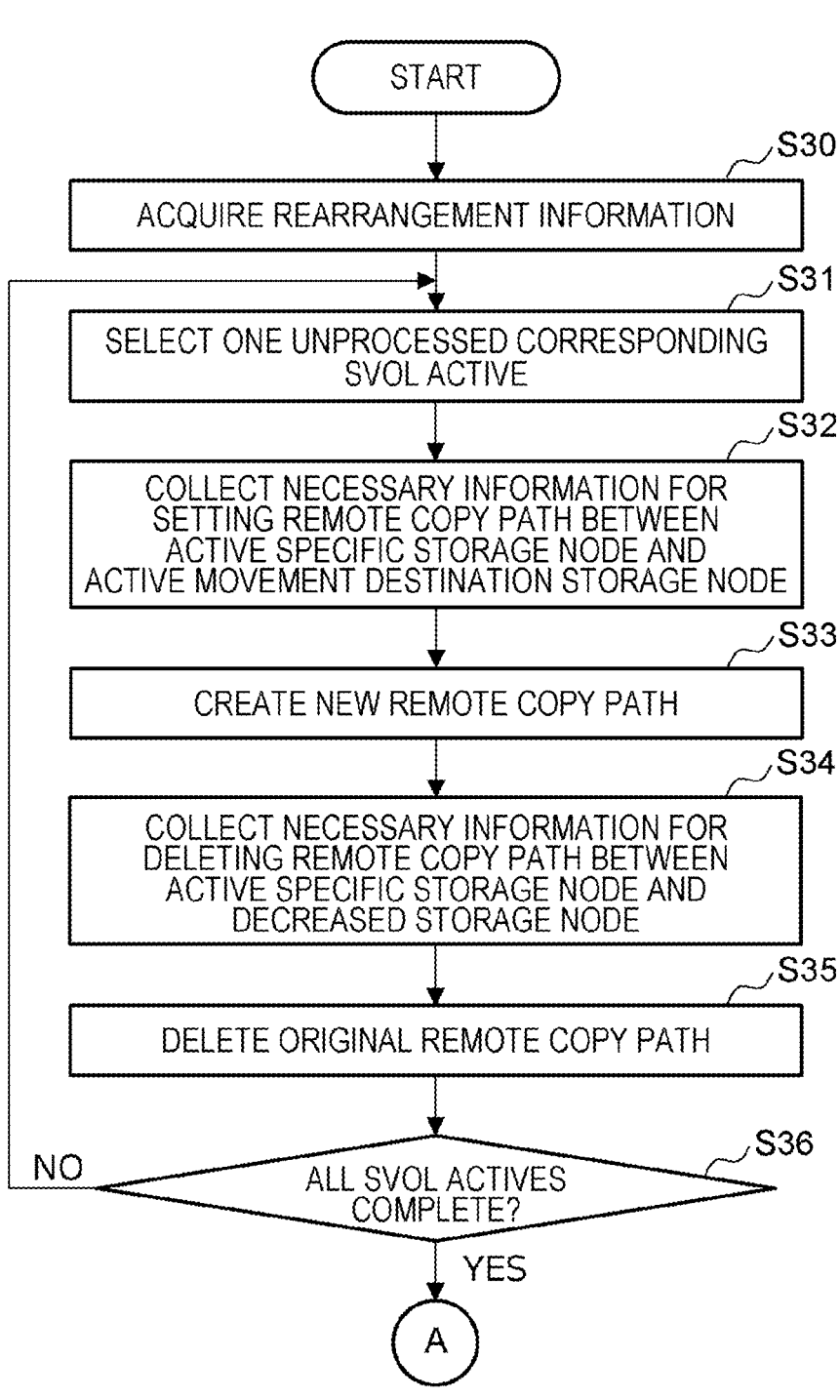
FIG. 17A is a flowchart illustrating a processing procedure of a pair management software side storage node decreasing process.
Figure 17B:
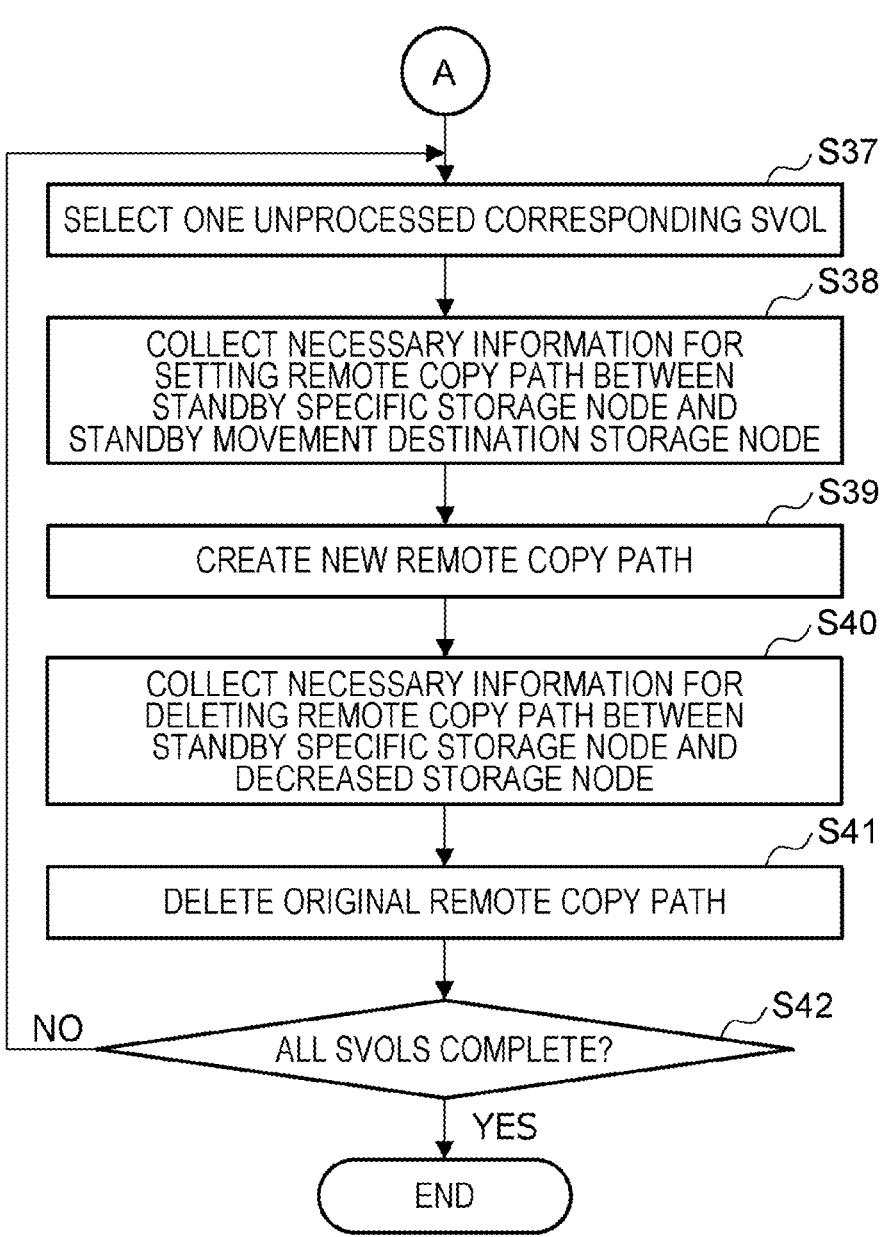
FIG. 17B is a flowchart illustrating a processing procedure of a management software side storage node decreasing process.

FIG. 17A and FIG. 17B illustrate a flow of a series of processes (hereinafter referred to as a pair management software side storage node decreasing process) executed by the pair management software 6 of the pair management device 5 that has received the rearrangement information described above.

When such rearrangement information is transmitted, the pair management software 6 starts the pair management software side storage node decreasing process illustrated in FIG. 17A and FIG. 17B, and first receives and acquires the transmitted rearrangement information (S30).

Subsequently, the pair management software 6 selects one active secondary volume SVOL which is not processed after step S32 from among the active secondary volumes SVOL recognized based on the acquired rearrangement information and moved from the decreased storage node 30 to another second storage node 30 (S31).

Next, the pair management software 6 collects, from the primary site management device 12, information necessary for setting the remote copy path 7 for performing remote copy between the active secondary volume (hereinafter referred to as a selected active secondary volume) SVOL selected in step S31 and the primary volume PVOL corresponding to the selected active secondary volume SVOL between the first storage node (hereinafter referred to as an active specific storage node) 11 in which the primary volume PVOL is created and the second storage node (hereinafter referred to as an active movement destination storage node) 30 of the movement destination of the selected active secondary volume (S32).

Specifically, the pair management software 6 designates the volume ID of the selected active secondary volume SVOL, and inquires the primary site management software 26 of the primary site management device 12 about the volume ID of the primary volume PVOL corresponding to the selected active secondary volume SVOL and the storage control software ID of the storage control software 35 having the ownership of the primary volume PVOL. In addition, the pair management software 6 inquires the primary site management software 26 of the primary site management device 12 about the IP address of each port 23 included in the active specific storage node 11 in which the storage control software 35 is arranged and the IP address of each port 23 included in the active movement destination storage node 30.

The primary site management software 26 that has received this inquiry acquires the volume ID of the primary volume PVOL corresponding to the selected active secondary volume SVOL from the volume pair management table 44 (FIG. 9) held therein. In addition, the primary site management software 26 acquires the storage control software ID of the storage control software 35 having the ownership of the primary volume PVOL and the node ID of the active specific storage node 11 in which the primary volume PVOL is created from the volume management table 43 held therein.

Furthermore, the primary site management software 26 acquires the port ID of each port 23 included in the active specific storage node 11 and the port ID of each port 23 included in the active movement destination storage node 30 from the system configuration table 40 (FIG. 5) held therein. Then, the primary site management software 26 acquires the IP addresses of the ports 23 of the active specific storage node 11 and the active movement destination storage node 30, for which the port IDs have been acquired as described above, from the port management table 42 (FIG. 7) held therein. Then, the primary site management software 26 transmits these pieces of information acquired in this way to the pair management software 6.

Subsequently, the pair management software 6 gives an instruction to the primary site management software 26 and the secondary site management software 34 to create the remote copy path 7 connecting the primary volume PVOL of which the volume ID is acquired in step S32 and the selected active secondary volume SVOL between the active specific storage node 11 and the active movement destination storage node 30 (S33).

Specifically, the pair management software 6 creates two combinations of the IP address of each port 23 of the active specific storage node 11 acquired in step S32 and the IP address of each port 23 of the active movement destination storage node 30, and gives an instruction to each of the primary site management software 26 and the secondary site management software 34 to create a path connecting these IP addresses for each combination.

Thus, the primary site management software 26 and the secondary site management software 34 that have received this instruction store the combinations of the IP addresses as the combinations of the IP addresses on both end sides of the first path and the second path in the first and second path fields 45CA and 45CB of the unused record of the path management table 45 (FIG. 13) held therein, respectively, and store necessary information (e.g., information defined by default) in the protocol information field 45B, the access policy field 45D, and the priority path field 45E of the record. The primary site management software 26 and the secondary site management software 34 store the same path ID assigned to the remote copy path 7 in the path ID field 45A of the path management table 45.

Furthermore, the primary site management software 26 and the secondary site management software 34 update the value of the path ID field 44F of the record in which the selected active secondary volume SVOL in the volume pair management table 44 held therein is stored in the secondary volume ID field 44E (FIG. 12) to the same path ID assigned to the remote copy path 7.

Then, the primary site management software 26 transmits differential data of before and after the update, as described above, of the path management table 45 and the volume pair management table 44 held therein to each of the first storage nodes 11 in the primary site 2, thereby similarly updating the path management table 45 and the volume pair management table 44 held by each of the first storage nodes 11. Then, the secondary site management software 34 transmits differential data of before and after the update, as described above, of the path management table 45 and the volume pair management table 44 held therein to each of the second storage nodes 30 in the secondary site 3, thereby similarly updating the path management table 45 and the volume pair management table 44 held by each of the second storage nodes 30.

As described above, the remote path 7 is set between the active specific storage node 11 and the active movement destination storage node 30. The primary site management software 26 and the secondary site management software 34 may further cooperate to create an iSCSI initiator associated with the primary volume PVOL corresponding to the selected active secondary volume SVOL in the active specific storage node 11, create an iSCSI target associated with the selected active secondary volume SVOL in the active movement destination storage node 30, and perform processes until a session between the iSCSI initiator and the iSCSI target is established.

Next, the pair management software 6 collects, from the primary site management devices 12, information necessary for deleting the remote copy path 7 connecting the decreased storage node 30 of the movement source of the selected active secondary volume SVOL and the active specific storage node 11 (S34). Specifically, the pair management software 6 extracts the node ID of the decreased source storage node 30 from the rearrangement information notified from the secondary site management software 34, and inquires the primary site management software 26 about the IP address of each port 23 included in the decreased storage node 30 to which the node ID is assigned.

The primary site management software 26 that has received this inquiry acquires the port ID of each port 23 included in the decreased storage node 30 from the record corresponding to the decreased storage node 30 in the system configuration table 40 (FIG. 5) held therein. Then, the primary site management software 26 acquires the IP address of each port 23 of the decreased storage node 30 that has acquired the port ID in the above manner from the port management table 42 (FIG. 7) held therein. The primary site management software 26 then transmits the acquired IP address of each port 23 of the acquired decreased storage node 30 to the pair management software 6.

Then, the pair management software 26 gives an instruction to the primary site management software 26 and the secondary site management software 34 to delete the remote copy path 7 connecting the active specific storage node 11 and the decreased storage node 30 based on the IP address of each port 23 included in the decreased storage node 30 acquired in the above manner and the IP address of each port 23 included in the active specific storage node 11 acquired in step S32 (S35). Note that this instruction includes information on the IP address of each port 23 included in the active specific storage node 11 and information on the IP address of each port 23 included in the decreased storage node 30.

Thus, the primary site management software 26 and the secondary site management software 34 that have received this instruction specify a record in which at least one of the combinations of the IP address of each port 23 included in the active specific storage node 11 and the IP address of each port 23 included in the decreased storage node 30 is stored in the first or second path fields 45CA and 45CB from the records of the path management table 45 held therein, and delete the record from the path management table 45.

In addition, the primary site management software 26 transmits differential data of before and after the update as described above of the path management table 45 held therein to each of the first storage nodes 11 in the primary site 2, thereby similarly updating the path management table 45 held by each of the first storage nodes 11. Furthermore, the secondary site management software 34 also transmits differential data of before and after the update as described above of the path management table 45 held therein to each of the second storage nodes 30 in the secondary site 3, thereby similarly updating the path management table 45 held by each of the second storage nodes 30. As described above, the remote path 7 set between the active specific storage node 11 and the decreased storage node 30 is deleted.

Thereafter, the pair management software 26 determines whether or not the processes after step S32 have been finished execution for all the active secondary volumes SVOL moved from the decreased storage node 30 from the rearrangement information notified from the secondary site management software 34 to the other second storage nodes 30 (S36). Then, when a negative result is obtained in this determination, the pair management software 26 returns to step S31, and thereafter, repeats the processes of steps S31 to S36 while sequentially switching the active secondary volume SVOL selected in step S31 to another corresponding active secondary volume SVOL which is not processed after step S32.

By this repetition process, the remote copy path 7 connecting between each active secondary volume SVOL moved from the decreased storage node 30 to another second storage node 30 and the primary volume PVOL corresponding to the active secondary volume SVOL is sequentially set between the corresponding active specific storage node 11 and the active movement destination storage node 30, and the original remote copy path 7 set between the decreased storage node 30 that is the movement source of the active secondary volume SVOL and the active specific storage node 11 is sequentially deleted.

Then, when obtaining a positive result in step S36 by finishing the execution of the processes of step S32 to step S35 for each standby secondary volume SVOL moved to the increased storage node 30 in due course, the pair management software 6 selects one standby secondary volume SVOL that is not processed after step S38 from among the standby secondary volumes SVOL managed by each standby storage control software 35 arranged in the decreased storage node 30 moved from the decreased storage node 30 to the other second storage node 30 (S37).

Next, the pair management software collects, from the primary site management device 12, information necessary for setting the remote copy path 7 for performing remote copy between the active secondary volume (hereinafter referred to as a selected standby secondary volume) SVOL selected in step S37 and the primary volume PVOL corresponding to the selected standby secondary volume SVOL between the first storage node (hereinafter referred to as a standby specific storage node) 11 in which the primary volume PVOL is created and the second storage node (hereinafter referred to as a standby movement destination storage node) 30 of the movement destination of the selected standby secondary volume (S38).

Specifically, the pair management software 6 designates the volume ID of the selected standby secondary volume SVOL, and inquires the primary site management software 26 of the primary site management device 12 about the volume ID of the primary volume PVOL corresponding to the selected standby secondary volume SVOL and the storage control software ID of the storage control software 35 having the ownership of the primary volume PVOL. In addition, the pair management software 6 inquires the primary site management software 26 of the primary site management device 12 about the IP address of each port 23 included in the standby specific storage node 11 in which the storage control software 35 is arranged and the IP address of each port 23 included in the standby movement destination storage node 30.

The primary site management software 26 that has received this inquiry acquires the volume ID of the primary volume PVOL corresponding to the selected standby secondary volume SVOL from the volume pair management table 44 (FIG. 9) held therein. In addition, the primary site management software 26 acquires the storage control software ID of the storage control software 35 having the ownership of the primary volume PVOL and the node ID of the standby specific storage node 11 in which the primary volume PVOL is created from the volume management table 43 held therein.

Furthermore, the primary site management software 26 acquires the port ID of each port 23 included in the standby specific storage node 11 and the port ID of each port 23 included in the standby movement destination storage node 30 from the system configuration table 40 (FIG. 5) held therein. Then, the primary site management software 26 acquires the IP addresses of the ports 23 of the standby specific storage node 11 and the standby movement destination storage node 30, for which the port IDs have been acquired as described above, from the port management table 42 (FIG. 7) held therein. Then, the primary site management software 26 transmits these pieces of information acquired in this way to the pair management software 6.

Subsequently, the pair management software 6 gives an instruction to the primary site management software 26 and the secondary site management software 34 to create the remote copy path 7 connecting the primary volume PVOL of which the volume ID is acquired in step S38 and the selected standby secondary volume SVOL between the standby specific storage node 11 and the standby movement destination storage node 30 (S39).

Specifically, the pair management software 6 creates two combinations of the IP address of each port 23 of the standby specific storage node 11 acquired in step S38 and the IP address of each port 23 of the standby movement destination storage node 30, and gives an instruction to each of the primary site management software 26 and the secondary site management software 34 to create a path connecting these IP addresses for each combination.

Thus, the primary site management software 26 and the secondary site management software 34 that have received this instruction store the combinations of the IP addresses as the combinations of the IP addresses on both end sides of the first path and the second path in the first and second path fields 45CA and 45CB of the unused record of the path management table 45 (FIG. 13) held therein, respectively, and store necessary information (e.g., information defined by default) in the protocol information field 45B, the access policy field 45D, and the priority path field 45E of the record. The primary site management software 26 and the secondary site management software 34 store the same path ID assigned to the remote copy path 7 in the path ID field 45A of the path management table 45.

Furthermore, the primary site management software 26 and the secondary site management software 34 update the value of the path ID field 44F of the record in which the selected standby secondary volume SVOL in the volume pair management table 44 held therein is stored in the secondary volume ID field 44E (FIG. 12) to the same path ID assigned to the remote copy path 7.

Then, the primary site management software 26 transmits differential data of before and after the update, as described above, of the path management table 45 and the volume pair management table 44 held therein to each of the first storage nodes 11 in the primary site 2, thereby similarly updating the path management table 45 and the volume pair management table 44 held by each of the first storage nodes 11. Then, the secondary site management software 34 transmits differential data of before and after the update, as described above, of the path management table 45 and the volume pair management table 44 held therein to each of the second storage nodes 30 in the secondary site 3, thereby similarly updating the path management table 45 and the volume pair management table 44 held by each of the second storage nodes 30.

As described above, the remote path 7 is set between the standby specific storage node 11 and the standby movement destination storage node 30. Note that the primary site management software 26 and the secondary site management software 34 may further cooperate to create an iSCSI initiator associated with the primary volume PVOL corresponding to the selected standby secondary volume SVOL in the standby specific storage node 11, create an iSCSI target associated with the selected standby secondary volume SVOL in the standby movement destination storage node 30, and perform processes until a session between the iSCSI initiator and the iSCSI target is established.

Next, the pair management software 6 collects, from the primary site management device 12, information necessary for deleting the remote copy path 7 connecting the decreased storage node 30, which is the movement source of the selected standby secondary volume SVOL, and the standby specific storage node 11 (S39). Specifically, the pair management software 6 extracts the node ID of the decreased source storage node 30 from the rearrangement information notified from the secondary site management software 34, and inquires the primary site management software 26 about the IP address of each port 23 included in the decreased storage node 30 to which the node ID is assigned.

The primary site management software 26 that has received this inquiry acquires the port ID of each port 23 included in the decreased storage node 30 from the record corresponding to the decreased storage node 30 in the system configuration table 40 (FIG. 5) held therein. Then, the primary site management software 26 acquires the IP address of each port 23 of the decreased storage node 30 that has acquired the port ID in the above manner from the port management table 42 (FIG. 7) held therein. The primary site management software 26 then transmits the acquired IP address of each port 23 of the acquired decreased storage node 30 to the pair management software 6.

Then, the pair management software 26 gives an instruction to the primary site management software 26 and the secondary site management software 34 to delete the remote copy path 7 connecting the standby specific storage node 11 and the decreased storage node 30 based on the IP address of each port 23 included in the decreased storage node 30 acquired in the above manner and the IP address of each port 23 included in the standby specific storage node 11 acquired in step S32 (S41). Note that this instruction includes information on the IP address of each port 23 included in the standby specific storage node 11 and information on the IP address of each port 23 included in the decreased storage node 30.

Thus, the primary site management software 26 and the secondary site management software 34 that have received this instruction specify a record in which at least one of the combinations of the IP address of each port 23 included in the standby specific storage node 11 and the IP address of each port 23 included in the decreased storage node 30 is stored in the first or second path fields 45CA and 45CB from the records of the path management table 45 held therein, and delete the record from the path management table 45.

In addition, the primary site management software 26 transmits differential data of before and after the update as described above of the path management table 45 held therein to each of the first storage nodes 11 in the primary site 2, thereby similarly updating the path management table 45 held by each of the first storage nodes 11. Furthermore, the secondary site management software 34 also transmits differential data of before and after the update as described above of the path management table 45 held therein to each of the second storage nodes 30 in the secondary site 3, thereby similarly updating the path management table 45 held by each of the second storage nodes 30. As described above, the remote path 7 set between the standby specific storage node 11 and the decreased storage node 30 is deleted.

Thereafter, the pair management software 26 determines whether or not the processes after step S38 have been finished execution for all the active secondary volumes SVOL moved from the decreased storage node 30 recognized from the rearrangement information notified from the secondary site management software 34 to the other second storage nodes 30 (S42). Then, when a negative result is obtained in this determination, the pair management software 26 returns to step S37, and thereafter, repeats the processes of steps S37 to S42 while sequentially switching the standby secondary volume SVOL selected in step S37 to another corresponding standby secondary volume SVOL which is not processed after step S38.

By this repetition process, the remote copy path 7 connecting each standby secondary volume SVOL moved from the decreased storage node 30 to another second storage node 30 and the primary volume PVOL corresponding to the standby secondary volume SVOL is sequentially set between the corresponding standby specific storage node 11 and the standby movement destination storage node 30, and the original remote copy path 7 set between the decreased storage node 30 that is the movement source of the standby secondary volume SVOL and the standby specific storage node 11 is sequentially deleted.

Then, the pair management software 6 ends the execution of the processes of step S38 to step S41 for each standby secondary volume SVOL moved from the decreased storage node 30 to another second storage node 30 in due course, and when a positive result is obtained in step S42, the pair management software side storage node decreasing process is ended.

(4) EFFECTS OF PRESENT EMBODIMENT

As described above, in the storage system 1 of the present embodiment, when the number of the second storage nodes 30 is increased/decreased in the site 3, under the control of the pair management device 5, a new remote copy path 7 is reset to the second storage node 30 of a rearrangement destination of the storage control software 35 rearranged along with the increase/decrease of the second storage node 30 and the secondary volume SVOL for which the storage control software 35 has the ownership, and the corresponding original remote copy path 7 set so far in the second storage node 30 of a rearrangement source is deleted.

Therefore, in the present storage system 1, even after the increase/decrease of the second storage node 30, remote copy between the second storage node 30 of the rearrangement destination of the rearranged storage control software 35 and the secondary volume SVOL for which by the storage control software 35 has the ownership, and the first storage node 11 in which the primary volume PVOL associated with the secondary volume SVOL is arranged can be performed via the newly created remote copy path 7.

Therefore, according to the present storage system 1, even in a case where a failure occurs in the active storage control software 35 or the second storage node 30 in which the active storage control software 35 is arranged and the failover is executed, it is possible to suppress the transfer of the journal data JNL in the secondary site 3 due to the increase/decrease of the second storage node 30, and thus, it is possible to prevent the performance degradation of the remote copy process.

(5) OTHER EMBODIMENTS

Note that, in the above-described embodiment, a case where the primary site management device 12 is provided separately from the first storage node 11 in the primary site 2 has been described, but the present invention is not limited thereto, and the function of the primary site management device 12 may be implemented in any of the first storage nodes 11, and the primary site management device 12 may be omitted.

Similarly, in the above-described embodiment, a case where the secondary site management device 31 is provided separately from the second storage node 30 in the secondary site 3 has been described, but the present invention is not limited thereto, and the function of the secondary site management device 31 may be implemented in any of the second storage nodes 30, and the secondary site management device 31 may be omitted.

Furthermore, in the above-described embodiment, a case where the present invention is applied to a case where the second storage node 30 is increased/decreased in the secondary site 3 has been described, but the present invention is not limited thereto, and can be similarly applied to a case where the first storage node 11 is increased/decreased in the primary site 2.

Furthermore, in the above-described embodiment, the case where the pair management software 6 acquires necessary information from the primary site management device 5 in steps S12 and S14 of the pair management software side storage node increasing process and steps S32 and S34 of the pair management software side storage node decreasing process has been described, but the present invention is not limited thereto, and the information may be acquired from the secondary site management device 31 or the first or second storage nodes 11 and 30. In addition, the information on the primary site 2 may be acquired from the primary site management device 5, and the information on the secondary site 3 may be acquired from the secondary site management device 31.

Furthermore, in the above-described embodiment, a case where the pair management device 5 includes one computer device has been described, but the present invention is not limited thereto, and the pair management device 5 may include a distributed computing system including a plurality of computer devices.

The present invention can be applied to a storage system including one or a plurality of first storage nodes installed at a primary site and a plurality of second storage nodes installed at a secondary site.

The invention claimed is:

1. A storage system configured to maintain uninterrupted remote-copy replication when a second storage node at a secondary site is dynamically increased or decreased, the system comprising:
   one or a plurality of first storage nodes installed at a primary site;
   a plurality of second storage nodes installed at the secondary site; and
   a first management device,
   wherein (a) each first storage node is provided with a primary volume that a host device can read from and write to,
   (b) each second storage node is provided with a secondary volume that backs up data written to the corresponding primary volume, and
   (c) for every pair of corresponding primary and secondary volumes a remote copy path is set between the first storage node and the second storage node that hosts the secondary volume, the remote copy path including first and second physical routes whose addressing information is stored in a path-management table,
   wherein in response to movement of the secondary volume triggered by increase or decrease of a second storage node, the first management device:
      (i) collects, before replication is suspended, port-address information of the first storage node that owns the corresponding primary volume and port-address information of a destination second storage node that will host the moved secondary volume,
      (ii) establishes, using the collected port-address information, a new remote copy path between the first storage node and the destination second storage node, stores the new port-address information in the path-management table, and resumes remote copying over the new path, and
      (iii) after successful resumption of remote copying, deletes from the path-management table the port-address information that defined an original remote copy path between the first storage node and a source second storage node that previously hosted the secondary volume, thereby preventing continued use of the obsolete path.

2. The storage system according to claim 1, wherein the first management device is installed at a location different from the primary site and the secondary site.

3. The storage system according to claim 1, further comprising:
   a second management device disposed at the primary site and configured to manage each first storage node; and
   a third management device disposed at the secondary site and configured to manage each second storage node,
   wherein the first management device further:
      (i) collects necessary information from the second and/or third management devices when a second storage node is increased or decreased at the secondary site and
      (ii) instructs the second and third management devices to set the new remote copy path and delete the original remote copy path based on the collected information.

4. The storage system according to claim 3, wherein, when a second storage node is increased, the first management device further:
      (i) acquires, from the third management device, information identifying (A) the secondary volume that is moved to an increased second storage node, (B) a second storage node that is a rearrangement source of the secondary volume, and (C) the increased second storage node;
      (ii) acquires, from the second or third management device, port-address information of (A) the first storage node that hosts the primary volume corresponding to the moved secondary volume and (B) the increased second storage node, and
      (iii) instructs the second and third management devices to set the new remote copy path between the first storage node and the increased second storage node using the acquired port-address information.

5. The storage system according to claim 4, wherein the first management device further:

acquires port-address information of the second storage node that is the rearrangement source of the secondary volume moved to the increased second storage node from the second or third management device and instructs the second and third management devices to delete the original remote copy path between the first storage node that hosts the primary volume corresponding to the moved secondary volume exists and the rearrangement-source second storage node based on the acquired port-address information.

6. The storage system according to claim 3, wherein, when a second storage node is decreased, the first management device further:

(i) acquires, from the third management device, information identifying (A) the secondary volume moved from the decreased second storage node to another second storage node, (B) the other second storage node, and (C) the decreased second storage node;

(ii) acquires, from the second or third management device, port-address information of (A) the first storage node that hosts the primary volume corresponding to the moved secondary volume and (B) the other second storage node; and (iii) instructs the second and third management devices to set a new remote copy path between the first storage node and the other second storage node based on the acquired port-address information.

7. The storage system according to claim 6, wherein the first management device further:

acquires port-address information of the decreased second storage node, and instructs the second and third management devices to delete an original remote copy path between the first storage node that hosts the primary volume corresponding to the moved secondary volume exists and the decreased second storage node based on the acquired port-address information.

8. A path management method for maintaining uninterrupted remote-copy replication when a second storage node at a secondary site is dynamically increased or decreased, the method comprising:

(a) detecting, by a management process, movement of a secondary volume from a source second storage node to a destination second storage node in response to the increase or decrease of the source second storage node;

(b) collecting, before replication is suspended, port-address information of (i) a first storage node that hosts a primary volume corresponding to the moved secondary volume and (ii) the destination second storage node that will host the moved secondary volume;

(c) establishing, using the collected port-address information, a new remote copy path between the first storage node and the destination second storage node and writing the port-address information of the new remote copy path to a path-management table;

(d) resuming remote-copy replication over the new remote copy path; and (e) after replication has successfully resumed, deleting from the path-management table the port-address information that defined an original remote copy path between the first storage node and the source second storage node, thereby preventing continued use of the original remote copy path.

9. The path management method of claim 8, wherein, when a second storage node is increased, step (b) further comprises (i) acquiring, from a management process operating at the secondary site, information identifying the secondary volume moved to the increased second storage node, the source second storage node, and the increased second storage node and (ii) acquiring, from a management process operating at the primary or secondary site, port-address information for the first storage node that hosts the primary volume corresponding to the moved secondary volume and port-address information for the increased second storage node; and wherein step (c) establishes the new remote copy path between the first storage node and the increased second storage node by using the acquired port-address information.

10. The path management method of claim 9, wherein step (b) also acquires port-address information for the source second storage node, and step (e) deletes, on the basis of the acquired port-address information, the original remote copy path between the first storage node and the source second storage node that previously hosted the secondary volume.

11. The path management method of claim 8, wherein, when a second storage node is decreased, step (b) further comprises (i) acquiring, from a management process operating at the secondary site, information identifying the secondary volume moved from the decreased second storage node to a destination second storage node, the destination second storage node, and the decreased second storage node and (ii) acquiring, from a management process operating at the primary or secondary site, port-address information for the first storage node that hosts the primary volume corresponding to the moved secondary volume and port-address information for the destination second storage node; and wherein step (c) establishes the new remote copy path between the first storage node and the destination second storage node by using the acquired port-address information.

12. The path management method of claim 11, wherein step (b) also acquires port-address information for the decreased second storage node, and step (e) deletes, on the basis of the acquired port-address information, the original remote copy path between the first storage node and the decreased second storage node.

* * * * *